US012749901B2

(12) United States Patent
Jung

(10) Patent No.: US 12,749,901 B2
(45) **Date of Patent: *Sep. 29, 2026**

(54) WIRELESS POWER TRANSMITTING AND CHARGING SYSTEM

(71) Applicant: GE Hybrid Technologies, LLC, Niskayuna, NY (US)

(72) Inventor: Chun Kil Jung, Seoul (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,211

(22) Filed: Jan. 31, 2024

(65) Prior Publication Data

US 2024/0258820 A1 Aug. 1, 2024

Related U.S. Application Data

(63) Continuation of application No. 17/532,931, filed on Nov. 22, 2021, now Pat. No. 11,894,712, which is a (Continued)

(30) Foreign Application Priority Data

Aug. 31, 2015 (KR) ........................ 10-2015-0122469

(51) Int. Cl.
*H02J 7/02* (2016.01)
*H02J 7/80* (2026.01)
(Continued)

(52) U.S. Cl.
CPC *H02J 7/02* (2013.01); *H02J 7/80* (2026.01); *H02J 50/12* (2016.02); *H02J 50/40* (2016.02);
(Continued)

(58) Field of Classification Search
CPC .... H02J 7/02; H02J 50/80; H02J 50/90; H02J 50/12; H02J 50/40; H02J 50/60; H02J 7/0047
See application file for complete search history.

(56) References Cited

U.S. PATENT DOCUMENTS 10,658,872 B2 5/2020 Jung
11,211,824 B2 12/2021 Jung
(Continued)

FOREIGN PATENT DOCUMENTS

JP 2014140303 7/2014
JP 2014195405 10/2014
(Continued)

OTHER PUBLICATIONS

"Korea patent application No. 10-2024-0036432 Request for the submission of Opinion", Aug. 27, 2024, 5 pages.
(Continued)

*Primary Examiner* — Daniel C Puentes
(74) *Attorney, Agent, or Firm* — DeLizio, Peacock, Lewin & Guerra LLP

(57) ABSTRACT

A wireless power transmitting and charging system is disclosed. A method for operating a power transmitter of the wireless power transmitting and charging system comprises the steps of: maintaining a ping value table where ping signal conditions are mapped according to the height of a power receiver; recognizing the power receiver by varying a ping signal according to the ping signal conditions recorded in the ping value table; and controlling a charging mode according to a message received from the power receiver.

17 Claims, 19 Drawing Sheets

Related U.S. Application Data continuation of application No. 16/841,325, filed on Apr. 6, 2020, now Pat. No. 11,211,824, which is a continuation of application No. 15/560,164, filed as application No. PCT/KR2016/002965 on Mar. 24, 2016, now Pat. No. 10,658,872.

(60) Provisional application No. 62/137,538, filed on Mar. 24, 2015.

(51) Int. Cl.

| | |
|---|---|
| ***H02J 50/12*** | (2016.01) |
| ***H02J 50/40*** | (2016.01) |
| ***H02J 50/60*** | (2016.01) |
| ***H02J 50/80*** | (2016.01) |
| ***H02J 50/90*** | (2016.01) |

(52) U.S. Cl.

CPC .............. *H02J 50/60* (2016.02); *H02J 50/80* (2016.02); *H02J 50/90* (2016.02)

(56) References Cited

U.S. PATENT DOCUMENTS

| | | | | |
|---|---|---|---|---|
| 11,894,712 | B2 * | 2/2024 | Jung | H02J 7/02 |
| 2010/0259217 | A1 * | 10/2010 | Baarman | H02J 50/80 320/108 |
| 2012/0161535 | A1 | 6/2012 | Jung et al. | |
| 2014/0009109 | A1 | 1/2014 | Lee et al. | |
| 2014/0035522 | A1 | 2/2014 | Oishi | |
| 2015/0000889 | A1 | 1/2015 | Bellamkonda et al. | |
| 2016/0056664 | A1 * | 2/2016 | Partovi | B60L 53/122 307/104 |
| 2016/0141884 | A1 | 5/2016 | Lee et al. | |
| 2016/0336807 | A1 * | 11/2016 | Mach | H02J 50/80 |
| 2018/0097403 | A1 | 4/2018 | Jung | |
| 2019/0280534 | A1 | 9/2019 | Park | |
| 2020/0195064 | A1 * | 6/2020 | Cai | H02J 50/90 |
| 2020/0235610 | A1 | 7/2020 | Jung | |
| 2022/0085655 | A1 | 3/2022 | Jung | |

FOREIGN PATENT DOCUMENTS

| | | |
|---|---|---|
| KR | 1020110137393 | 12/2011 |
| KR | 1020120047548 | 5/2012 |
| KR | 1020140095352 | 8/2014 |
| WO | 2009014125 | 1/2009 |

OTHER PUBLICATIONS

"Korea patent application No. 10-2023-0048720 Request for Submission of Opinion", Jun. 16, 2023, 2 pages.
"Korean Application No. 10-2015-0122469 Notification of Reason for Refusal", Apr. 27, 2021, 2 pages.
"PCT Application No. PCT/KR2016/002965 International Preliminary Report on Patentability", Sep. 26, 2017, 7 pages.
"PCT Application No. PCT/KR2016/002965 International Search Report", Jun. 21, 2016, 2 pages.
"PCT Application No. PCT/KR2016/002965 Written Opinion", Jun. 21, 2016, 6 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/560,164 Final Office Action", Oct. 21, 2019, 15 pages.
"U.S. Appl. No. 15/560,164 Office Action", Feb. 7, 2019, 14 pages.
"U.S. Appl. No. 16/841,325 Final Office Action", Jun. 9, 2021, 15 pages.
"U.S. Appl. No. 16/841,325 Office Action", Oct. 5, 2020, 16 pages.
"U.S. Appl. No. 17/532,931 Final Office Action", Aug. 17, 2023, 8 pages.
"U.S. Appl. No. 17/532,931 Non Final Office Action", Jan. 12, 2023, 15 pages.

* cited by examiner

◉ PRESSURE SENSOR AND/OR TEMPERATURE SENSOR

WIRELESS POWER TRANSMITTING AND CHARGING SYSTEM

RELATED APPLICATIONS

This application is a continuation of U.S. patent application Ser. No. 17/532,931, filed Nov. 22, 2021, which is a continuation of U.S. patent application Ser. No. 16/841,325, filed Apr. 6, 2020, which is a continuation of U.S. patent application Ser. No. 15/560,164, filed Sep. 21, 2017, which is the National Stage of International Application No. PCT/KR2016/002965, filed Mar. 24, 2016, which claims the priority benefit of, Korean Application No. 10-2015-0122469, filed Aug. 31, 2015, which claims the priority benefit to Provisional Application No. 62/137,538, filed Mar. 24, 2015.

TECHNICAL FIELD

The present disclosure relates to a wireless power transmitting and charging system for transmitting and receiving power wirelessly.

DESCRIPTION OF THE RELATED TECHNOLOGY

A wireless power transmitting system includes a wireless power transmitter for transmitting electrical energy wirelessly and a wireless power receiving device for receiving electrical energy from the wireless power transmitter.

Using the wireless power transmitting system, for example, just by placing a mobile phone on a charge pad, not connecting the mobile phone with a separate charge connector, it is available to charge a battery of the mobile phone.

The techniques for transferring electrical energy wirelessly may be divided into a magnetic induction technique, a magnetic resonance technique and an electromagnetic wave technique according to the principle of transmitting electrical energy.

The magnetic induction technique is a technique of transferring electrical energy utilizing the phenomenon that electricity is induced between a transmitter coil and a receiver coil.

The magnetic resonance technique is a technique of generating magnetic field that oscillates with a resonance frequency in a transmitter coil and transferring energy intensively to a receiver coil designed with the same resonance frequency.

The electromagnetic wave technique is a technique of receiving electromagnetic wave using several rectennas in a receiver and transforming it to electrical energy.

Meanwhile, the wireless power transmission technique may also be divided into a flexibly coupled wireless power transfer technology (hereinafter, referred to as a 'flexibly coupled technology') and a tightly coupled wireless power transfer technology (hereinafter, referred to as a 'tightly coupled technology') according to a shape or a strength of the magnetic resonant coupling of a transmitter coil and a receiver coil.

In the case of the 'flexibly coupled technology', since magnetic resonance coupling may be formed between a single transmitter resonator and a plurality of receiver resonators, the Concurrent Multiple Charging may be available.

In this case, the 'tightly coupled technology' may be a technology in which only the power transmission between a single transmitter coil and a single receiver coil (one-to-one power transmission) is available.

As an example of the wireless power transmitting and charging system applied to a wireless power transmission network like a local computing environment, Korean patent publication No. 2014-0057503 (published on May 13, 2014) and Korean patent publication No. 2014-0061337 (published on May 13, 2014) are published. However, these related arts fail to provide a clear method for the power control.

SUMMARY

An object of the present disclosure is to provide a wireless power transmitting and charging system and an improved composition of the wireless power transmitting and charging system.

A method for transmitting wireless power and operating a power transmitter of a charge system according to an embodiment includes maintaining a ping value table where a ping signal condition is mapped to each height of a power receiver, detecting the power receiver by varying a ping signal according to the ping signal condition recorded in the ping value table and controlling a charge mode according to a message received from the power receiver.

A device for transmitting wireless power and a power transmitter of a charge system according to an embodiment includes a memory in which a ping value table where a ping signal condition is mapped to each height of a power receiver is stored, a detecting unit for detecting the power receiver by varying a ping signal according to the ping signal condition recorded in the ping value table and a charge mode control unit for controlling a charge mode according to a message received from the power receiver.

According to an embodiment of the present disclosure, efficient wireless power transmission and charge are available.

In addition, according to an embodiment of the present disclosure, when charging wirelessly, it is available to detect a power receiver efficiently without regard to a height of the power receiver, and to perform a wireless charge with an optimized condition.

DETAILED DESCRIPTION

Hereinafter, the embodiments of the present disclosure are described in detail with reference to the accompanying drawings.

Figure 1:
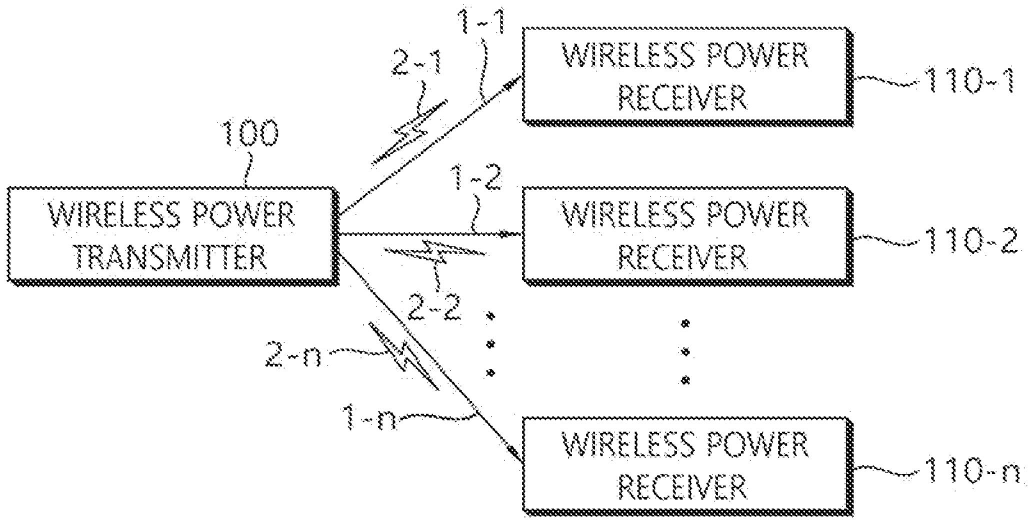
FIG. 1 is a block diagram illustrating constituting elements of a wireless power transmission system according to an embodiment of the present disclosure.

FIG. 1 is a diagram for describing an overall concept of a wireless power transmission system.

Referring to FIG. 1, a wireless charge system may transmit each power 1-1, 1-2 and **1-*n* wirelessly to a wireless power transmitter 100 and at least one wireless power receiver 110-1, 110-2 and 110-*n*. More particularly, the wireless power transmitter 100 may transmit power 1-1, 1-2 and 1-*n*** wirelessly only to the authenticated wireless power receiver that performs a predetermined authentication procedure.

The wireless power transmitter 100 may form an electrical connection with the wireless power receivers 110-1, 110-2 and **110-*n*. For example, the wireless power transmitter 100 may transmit wireless power in a form of electromagnetic wave to the wireless power receivers 110-1, 110-2 and 110-*n***.

In addition, the wireless power transmitter 100 may perform a bi-directional communication with the wireless power receivers 110-1, 110-2 and **110-*n*. In this case, the wireless power transmitter 100 and the wireless power receivers 110-1, 110-2 and 110-*n* may process or transmit and receive packets 2-1, 2-2 and 2-*n*** including a predetermined frame. The frame is described in more detail below. The wireless power receiver may be implemented, particularly, by a mobile communication terminal, a PDA, a PMP, a smart phone, and so on.

Furthermore, the wireless power transmitter 100 may provide power wirelessly to a plurality of the wireless power receivers 110-1, 110-2 and **110-*n*. For example, the wireless power transmitter 100 may transmit power to a plurality of the wireless power receivers 110-1, 110-2 and 110-*n* through the resonance technique. In the case that the wireless power transmitter 100 adopts the resonance technique, a distance between the wireless power transmitter 100 and the wireless power receivers 110-1, 110-2 and 110-*n* may be 30 m or shorter, preferably. In addition, the wireless power transmitter 100 adopts the electromagnetic induction technique, a distance between the wireless power transmitter 100 and the wireless power receivers 110-1, 110-2 and 110-*n*** may be 10 m or shorter, preferably.

In addition, the wireless power transmitter 100 may include a display means like a display, and may display a state of each of the wireless power receivers 110-1, 110-2 and **110-*n* based on a message received from each of the wireless power receivers 110-1, 110-2 and 110-*n*. Furthermore, the wireless power transmitter 100 may display a time expected until charge of each of the wireless power receivers 110-1, 110-2 and 110-*n*** is completed together.

Furthermore, the wireless power transmitter 100 may transmit a control signal configured to disable the wireless charge function to each of the wireless power receivers 110-1, 110-2 and **110-*n*. The wireless power receiver that receives the disable control signal of the wireless charge function from the wireless power transmitter 100** may disable the wireless charge function.

The wireless power receivers 110-1, 110-2 and **110-*n* may perform charge of the battery equipped therein by receiving wireless power from the wireless power transmitter 100. In addition, the wireless power receivers 110-1, 110-2 and 110-*n* may transmit a signal requesting a wireless power transmission, information required for a wireless power reception, wireless power state information or control information of the wireless power transmitter 100, and so on to the wireless power transmitter 100**. The information of the transmission signal is described in more detail below.

In addition, the wireless power receivers 110-1, 110-2 and **110-*n* may transmit a message that represents each charge state to the wireless power transmitter 100**.

Figure 2:
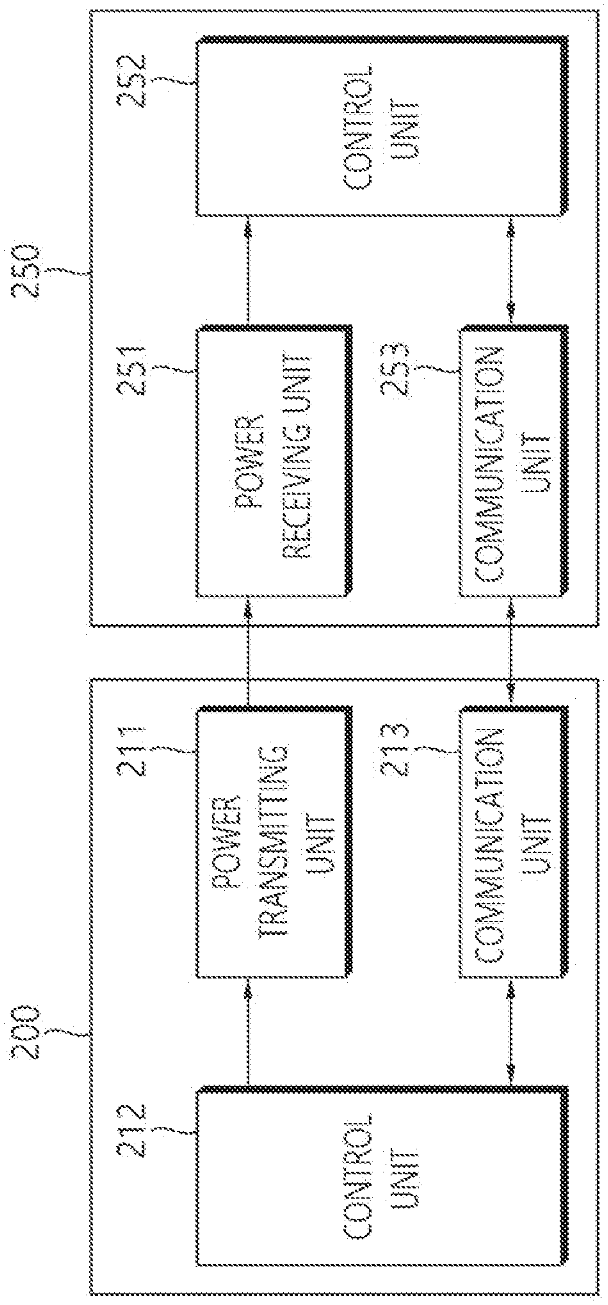
FIG. 2 is a block diagram of a wireless power transmitter and a wireless power receiver according to an embodiment of the present disclosure.

FIG. 2 is a block diagram of a wireless power transmitter and a wireless power receiver according to an embodiment of the present disclosure.

Referring to FIG. 2, a wireless power transmitter 200 may include a power transmitting unit 211, a control unit 212 and a communication unit 213. In addition, a wireless power receiver 250 may include a power receiving unit 251, a control unit 252 and a communication unit 253.

The power transmitting unit 211 may provide power required by the wireless power transmitter 200 and may provide power to the wireless power receiver 250 wirelessly. Here, the power transmitting unit 211 may provide power in a form of AC waveform, and while providing power in a form of DC waveform, may provide power in a form of AC waveform by transforming the DC waveform into AC waveform using an inverter. The power transmitting unit 211 may be implemented as a form of an embedded battery, or may also be implemented as a form of a power reception interface, and accordingly, may be implemented as a form of receiving power from outside and providing the power to another element. It is understood to a person skilled in the art that the power transmitting unit 211 is not limited if it is a means to provide the power of predetermined AC waveform.

Furthermore, the power transmitting unit 211 may provide AC waveform to the wireless power receiver 250 as a form of electromagnetic wave. The power transmitting unit 211 may further include a loop coil, and accordingly, may transmit and receive a predetermined electromagnetic wave. In the case that the power transmitting unit 211 is implemented as the loop coil, inductance L of the loop coil may be changeable. Meanwhile, it is understood that power transmitting unit 211 is not limited if it is a means able to transmit and receive electromagnetic wave.

The control unit 212 may control the overall operations of the wireless power transmitter 200. The control unit 212 may the overall operations of the wireless power transmitter 200 by using the algorithm, program or application required to control readout from a storing unit (not shown). The control unit 212 may be implemented as a form such as a CPU, a microprocessor and a minicomputer. The detailed operation of the control unit 212 is described in more detail below.

The communication unit 213 may perform a communication in a predetermined technique with the wireless power receiver 250. The communication unit 213 may perform a communication using the Near Field Communication (NFC), the Zigbee communication, the infrared communication, the visible light communication, and so on with the communication unit 253. The communication unit 213 according to an embodiment may perform a communication using the Zigbee communication technique of IEEE802.15.4 scheme. Furthermore, the communication unit 213 may use the Carrier Sense Multiple Access with Collision Avoidance (CSMA/CA) algorithm. The composition for the frequency and channel selection used by the communication unit 213 is described in more detail below. Meanwhile, the communication technique described above is just an example, but the present disclosure is not limited to a specific communication technique performed in the communication unit 213.

Meanwhile, the communication unit 213 may transmit a signal for the information of the wireless power transmitter 200. Here, the communication unit 213 may perform unicast, multicast or broadcast of the signal.

The communication unit 213 may receive power information from the wireless power receiver 250. Here, the power information may include at least one of capacity of the wireless power receiver, battery remains, charge number, use amount and battery ratio. In addition, the communication unit 213 may transmit a charge function control signal to control the charge function of the wireless power receiver 250. The charge function control signal may be a control signal makes the charge function be enabled or disabled by controlling the wireless power receiving unit 251 of a specific wireless power receiver 250.

Furthermore, the communication unit 213 may receive a signal from other wireless power transmitter (not shown), as well as the wireless power receiver 250. For example, the communication unit 213 may receive a Notice signal of a frame from other wireless power transmitter.

Meanwhile, in FIG. 2, it is shown that the power transmitting unit 211 and the communication unit 213 are implemented as different hardware and the wireless power transmitter 200 communicates in an out-band formality, but this is just an example. According to the present disclosure, the power transmitting unit 211 and the communication unit 213 are implemented as a single hardware and may perform communication in an in-band formality.

The wireless power transmitter 200 and the wireless power receiver 250 may receive various types of signals, and accordingly, a charge procedure may be performed through an admission of the wireless power receiver 250 to a wireless power network managed by the wireless power transmitter 200 and the wireless power transmission and reception. The procedure described above is described in more detail below.

Figure 3:
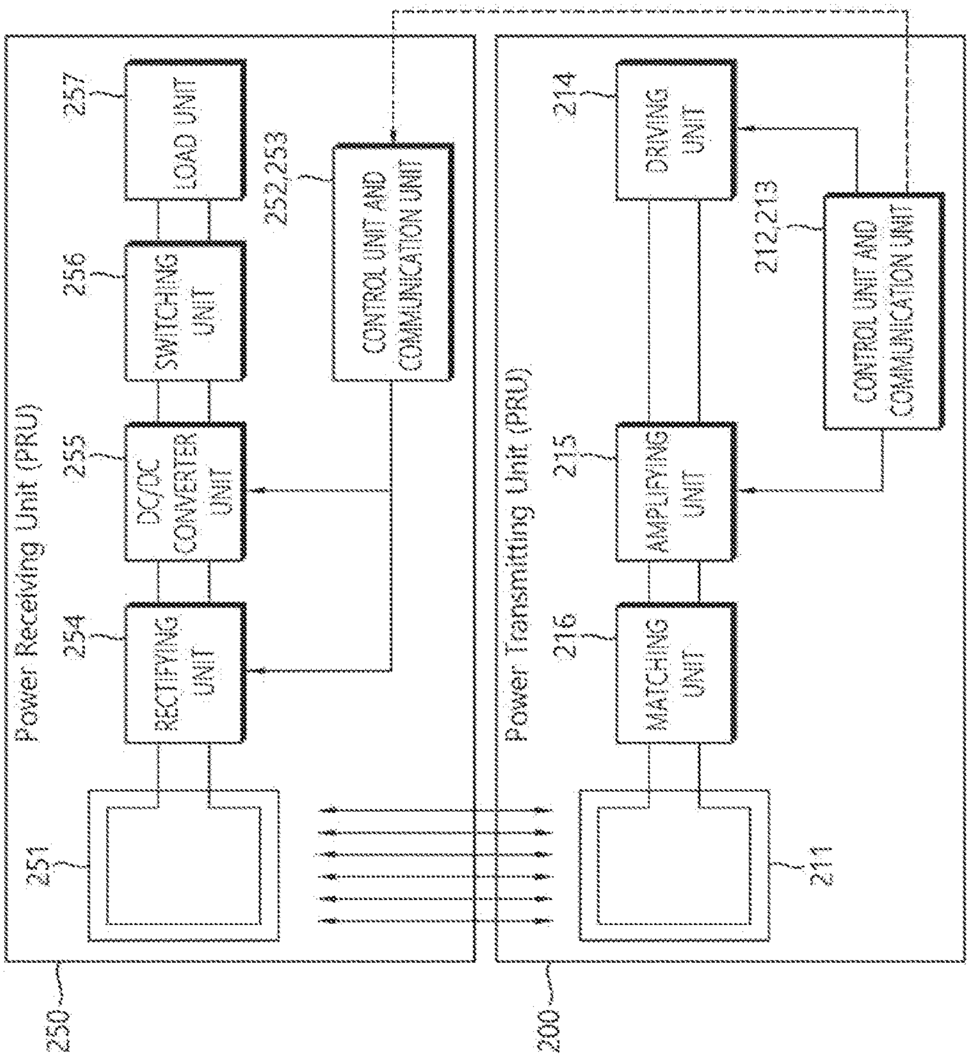
FIG. 3 is a detailed block diagram of the wireless power transmitter and the wireless power receiver according to an embodiment of the present disclosure.

In addition, FIG. 2 schematically exemplifies the composition of the wireless power transmitter 200 and the wireless power receiver 250, but FIG. 3 exemplifies a detailed composition of the wireless power transmitter 200 and the wireless power receiver 250. The detailed description is described below.

FIG. 3 is a detailed block diagram of the wireless power transmitter and the wireless power receiver according to an embodiment of the present disclosure.

Referring to FIG. 3, the wireless power transmitter 200 may include the power transmitting unit 211, the control unit and the communication unit 212 and 213, a driving unit 214, an amplifying unit 215 and a matching unit 216. The wireless power receiver 250 may include the power receiving unit 251, the control unit and the communication unit 252 and 253, a rectifying unit 254, a DC/DC converter unit 255, a switching unit 256 and a load unit 257.

The driving unit 214 may output a DC power that has a predetermined voltage value. The voltage value of the DC power outputted from the driving unit 214 may be controlled by the control unit and the communication unit 212 and 213.

The DC current outputted from the driving unit 214 may be outputted to the amplifying unit 215. The amplifying unit 215 may amplify the DC current with a predetermined gain. Furthermore, the amplifying unit 215 may transform the DC power into AC based on the signal inputted from the control unit and the communication unit 212 and 213. Accordingly, the amplifying unit 215 may output AC power.

The matching unit 216 may perform the impedance matching. For example, by adjusting the impedance seen from the matching unit 216, it may be controlled such that an output power becomes efficient or high power. The matching unit 216 may include at least one of a coil and a capacitor. The control unit and the communication unit 212 and 213 may control a connection state with at least one of the coil and the capacitor, and accordingly, may perform the impedance matching.

The power transmitting unit 211 may transmit the inputted AC power to the power receiving unit 251. The power transmitting unit 211 and the power receiving unit 251 may be implemented by resonance circuits that have the same resonance frequency. For example, the resonance frequency may be determined to be 6.78 MHz. The control unit and the communication unit 212 and 213 may perform a communication with the control unit and the communication unit 252 and 253 at the part of the wireless power receiver 250.

Meanwhile, the power receiving unit 251 may receive charge power from the power transmitting unit 211.

The rectifying unit 254 may rectify the wireless power received in the power receiving unit 251 into an AC form, for example, may be implemented as the bridge diode. The DC/DC converting unit 255 may convert the rectified power with a predetermined gain. For example, the DC/DC converting unit 255 may convert the rectified power such that the voltage at an output terminal 259 is 5 V. Meanwhile, at a front terminal 258 of the DC/DC converting unit 255, a minimum value and a maximum value of the voltage that is available to be applied may be preconfigured.

The switching unit 256 may connect the DC/DC converting unit 255 and the load unit 257. The switching unit 256 may maintain on/off state according to the control of the control unit 252. The load unit 257 may store the converted power which is inputted from the DC/DC converting unit 255 when the switching unit 256 is on state.

Figure 4:
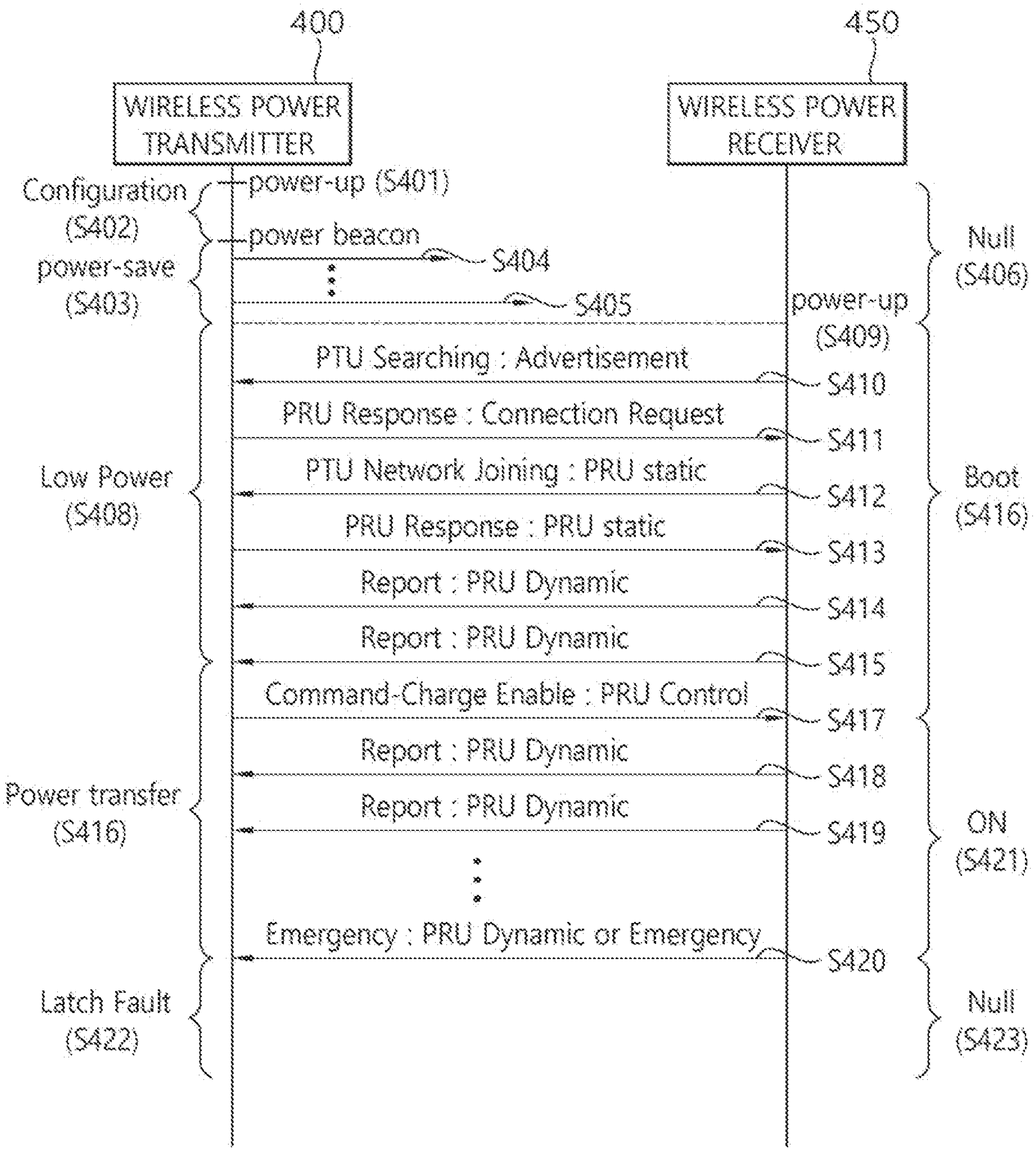
FIG. 4 is a flowchart for describing an operation of a wireless power transmitter and a wireless power receiver according to an embodiment of the present disclosure.

FIG. 4 is a flowchart for describing an operation of a wireless power transmitter and a wireless power receiver according to an embodiment of the present disclosure.

Referring to FIG. 4, a wireless power transmitter 400 may apply a power source (step, S401). When the power is applied, the wireless power transmitter 400 may configure an environment.

The wireless power transmitter 400 may enter a Power Save Mode (step, S403). In the Power Save Mode, the wireless power transmitter 400 may apply each of power beacons 404 and 405 for detecting heterogeneity with each period. For example, as shown in FIG. 4, the wireless power transmitter 400 may apply the power beacon for detection, and the size of the power value of each of the power beacons 404 and 405 for detection may be different. One or both of the power beacons 404 and 405 may have an amount of power and an application time for driving a communication unit of a wireless power receiver 450. For example, the wireless power receiver 450 may drive the communication unit by a part or both of the power beacons 404 and 405 for detection and may perform a communication with wireless power transmitter 400. Such state may be referred to as Null state.

The wireless power transmitter 400 may detect a load change by an arrangement of the wireless power receiver 450. The wireless power transmitter 400 may enter a low power mode (step, S409). The low power mode may be a mode in which the wireless power transmitter applies detection power periodically or aperiodically. Meanwhile, the wireless power receiver 450 may drive the communication unit based on the power received from the wireless power transmitter 400 (step, S409).

The wireless power receiver 450 may transmit a Power Transmitter Unit (PTU) searching signal to the wireless power transmitter 400 (step, S410). The wireless power receiver 450 may transmit the PTU searching signal as an Advertisement signal based on BLE. The wireless power receiver 450 may transmit the PTU searching signal periodically or aperiodically, and may transmit it until receiving a Power Receiver Unit (PRU) response signal from the wireless power transmitter 400 or a preconfigured time has come.

When the PTU searching signal is received from the wireless power receiver 450, the wireless power transmitter 400 may transmit the PRU response signal (step, S411). Here, the PRU response signal may establish a connection between the wireless power transmitter 400 and the wireless power receiver 450.

The wireless power receiver 450 may transmit a PRU static signal (step, S412). Here, the PRU static signal may be a signal indicating a state of the wireless power receiver 450 and may request an admission to a wireless power network which is managed by the wireless power transmitter 400.

The wireless power transmitter 400 may transmit a PTU static signal (step, S413). The PTU static signal transmitted by the wireless power transmitter 400 may be a signal indicating a capability of the wireless power transmitter 400.

When the wireless power transmitter 400 and the wireless power receiver 450 transmit and receive the PRU static signal and the PTU static signal, the wireless power receiver 450 may transmit a PRU dynamic signal periodically (steps, S414 and S415).

The PRU dynamic signal may include at least one type of parameter information which is measured in the wireless power receiver 450. For example, the PRU dynamic signal may include voltage information at a rear part of the rectifying unit of the wireless power receiver 450. A state of the wireless power receiver 450 may be referred to as Boot state.

The wireless power transmitter 400 may enter the power transmission mode (step, S416), and the wireless power transmitter 400 may transmit a PRU command signal, which is a command signal for the wireless power receiver 450 to perform charge (step, S417). In the power transmission mode, the wireless power transmitter 400 may transmit charge power.

The PRU command signal transmitted by the wireless power transmitter 400 may include information for enabling/disabling and information for permitting charge of the wireless power receiver 450. The PRU command signal may be transmitted when the wireless power transmitter 400 changes a state of the wireless power receiver 450 or may be transmitted with a preconfigured period (e.g., period of 250 ms). The wireless power transmitter 400 may change a configuration according to the PRU command signal and may transmit the PRU dynamic signal for reporting a state of the wireless power transmitter 400 (steps, S418 and S419). The PRU dynamic signal transmitted by the wireless power receiver 450 may include at least one of voltage, current, wireless power receiver state and temperature information. The state of the wireless power receiver 450 may be referred to as on state.

The wireless power receiver 450 may perform charge by receiving the PRU command signal. For example, in the case that the wireless power transmitter 400 has a power enough to charge the wireless power receiver 450, the wireless power transmitter 400 may transmit the PRU command signal. Meanwhile, the PRU command signal may be transmitted whenever the charge state is changed. For example, the PRU command signal may be transmitted when it may be transmitted in every 250 ms or a parameter is changed. The PRU command signal may be configured to be transmitted within a preconfigured threshold time (e.g., within 1 second) even in the case that a parameter is not changed.

Meanwhile, the wireless power receiver 450 may detect an occurrence of an error. The wireless power receiver 450 may transmit a warning signal to the wireless power transmitter 400 (step, S420). The warning signal may be transmitted as a PRU dynamic signal or a PRU warning signal. For example, wireless power receiver 450 may reflect an error situation to the PRU warning information field in Table 4 and transmit it to the wireless power transmitter 400. Otherwise, the wireless power receiver 450 may transmit a single warning signal indicating an error situation to the wireless power transmitter 400. When the wireless power transmitter 400 receives the PRU warning signal, the wireless power transmitter 400 may enter a Latching fault mode (step, S422). The wireless power receiver 450 may enter a Null state (step, S423).

Figure 5:
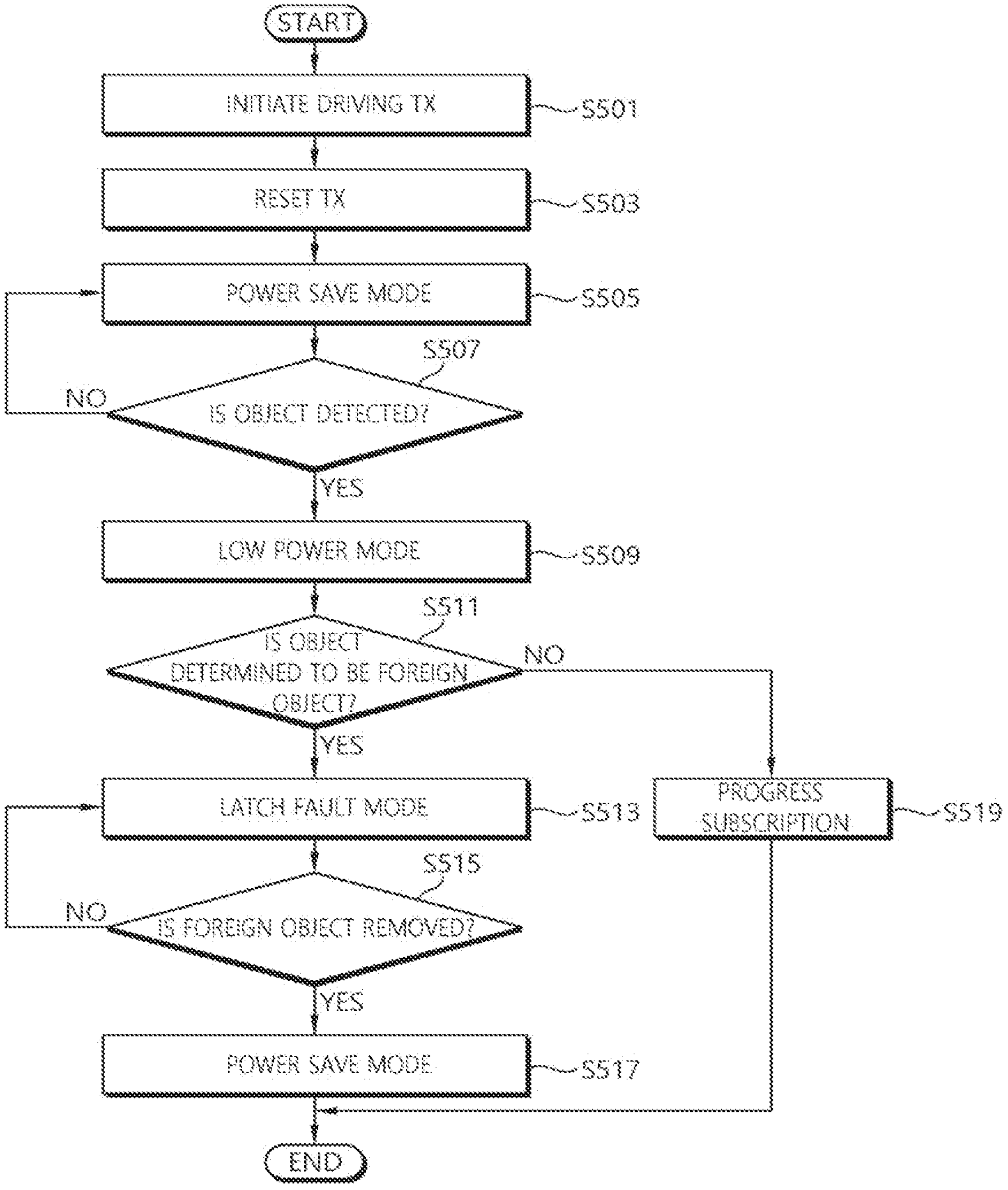
FIG. 5 is a flowchart for describing operations of a wireless power transmitter and a wireless power receiver according to another embodiment of the present disclosure.

FIG. 5 is a flowchart for describing operations of a wireless power transmitter and a wireless power receiver according to another embodiment of the present disclosure.

Figure 6:
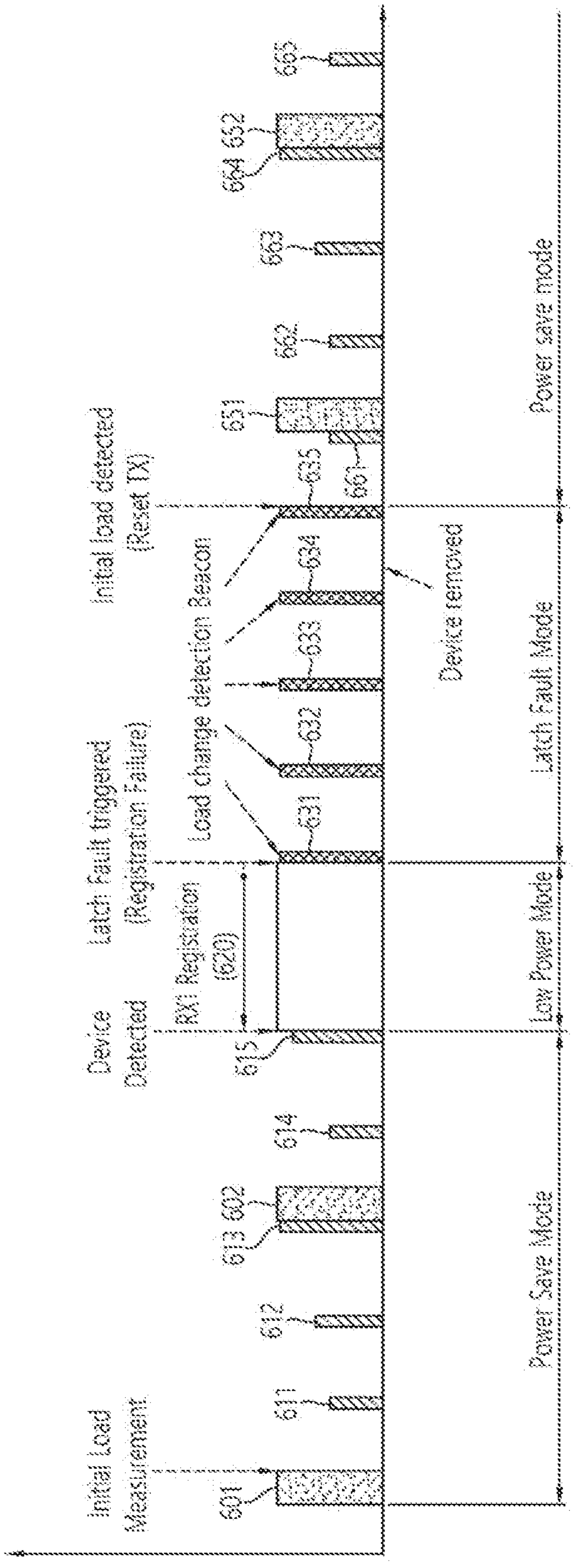
FIG. 6 is a graph with respect to the time axis of the amount of power applied by the wireless power transmitter according to the embodiment of FIG. 5.

The control method of FIG. 5 is described in more detail by referring to FIG. 6. FIG. 6 is a graph with respect to the time axis of the amount of power applied by the wireless power transmitter according to the embodiment of FIG. 5.

Referring to FIG. 5, the wireless power transmitter may initiate a driving (step, S501). Furthermore, the wireless power transmitter may reset an initial configuration (step, S503). The wireless power transmitter may enter the power save mode (step, S505). Here, the power save mode may correspond to a duration in which the wireless power transmitter applies heterogeneous power of which amount of power is different to a power transmitting unit. For example, the wireless power transmitter may correspond to duration in which second detected powers 601 and 602 and third detected powers 611, 612, 613, 614 and 615 to the power transmitting unit. Here, the wireless power transmitter may apply the second detected powers 601 and 602 with a second period periodically, and in the case of applying second detected powers 601 and 602, the wireless power transmitter may apply it during a second duration.

The wireless power transmitter may apply the third detected powers 611, 612, 613, 614 and 615 with a third period periodically, and in the case of applying the third detected powers 611, 612, 613, 614 and 615, the wireless power transmitter may apply it during a third duration. Meanwhile, although it is shown that each power value of the third detected powers 611, 612, 613, 614 and 615 is different, each power value of the third detected powers 611, 612, 613, 614 and 615 may be different or the same.

After outputting the third detected power 611, the wireless power transmitter may output the third detected power 612 that has the same amount of power. In the case that the wireless power transmitter outputs the third detected powers of which size is the same, the amount of power of the third detected power may have the amount of power that may detect the smallest wireless power receiver, for example, the wireless power receiver of category 1.

After outputting the third detected power 611, the wireless power transmitter may output the third detected power 612 that has different amount of power. In the case that the wireless power transmitter outputs the third detected powers of which sizes are different, each of the amounts of power of the third detected power may be an amount of power that is able to detect the wireless power receiver of category 1 to 5. For example, the third detected power 611 may have the amount of power that is able to detect the wireless power receiver of category 5, and the third detected power 612 may have the amount of power that is able to detect the wireless power receiver of category 3. And, the third detected power 613 may have the amount of power that is able to detect the wireless power receiver of category 1.

Meanwhile, the second detected powers 601 and 602 may be the power that is able to drive the wireless power receiver. More particularly, the second detected powers 601 and 602 may have the amount of power that is able to drive a control unit and a communication unit of the wireless power receiver.

The wireless power transmitter may apply the second detected powers 601 and 602 and the third detected powers 611, 612, 613, 614 and 615 to the power receiving unit with the second period and the third period, respectively. In the case that the wireless power receiver is disposed on the wireless power transmitter, the impedance seen from a point of the wireless power transmitter may be changed. The wireless power transmitter may detect a change of the impedance while the second detected powers 601 and 602 and the third detected powers 611, 612, 613, 614 and 615 are applied. For example, the wireless power transmitter may detect a change of the impedance while the third detected power 615 is applied. Accordingly, the wireless power transmitter may detect an object (step, S507). In the case that an object is not detected (step, S507—N), the wireless power transmitter may maintain the power save mode in which heterogeneous power is periodically applied (step, S505).

Meanwhile, in the case that impedance is changed, and an object is detected (step, S507—N), the wireless power transmitter may enter the low power mode. Here, the low power mode is a mode in which a driving power is applied, which has an amount of power that the wireless power transmitter is able to drive the control unit and the communication unit of the wireless power receiver. For example, as shown in FIG. 6, the wireless power transmitter may apply the driving power 620 to the power transmitting unit. The wireless power receiver may drive the control unit and the communication unit by receiving the driving power 620. The wireless power receiver may perform a communication based on a predetermined technique with the wireless power transmitter based on the driving power 620. For example, the wireless power receiver may transmit and receive data required for authentication and may subscribe to a wireless power network managed by the wireless power receiver based on it. However, in the case that a foreign object, not the wireless power receiver, is disposed, data transmission and reception may not be performed. Accordingly, the wireless power transmitter may determine whether the disposed object is a foreign object (step, S511). For example, in the case that the wireless power transmitter is unable to receive a response from an object during a preconfigured time, the wireless power transmitter may determine the object to be a foreign object.

In the case that it is determined to be a foreign object (step, S511—Y), the wireless power transmitter may enter a Latching fault mode. For example, the wireless power transmitter may apply first powers 631 to 634 with a first period periodically. The wireless power transmitter may detect impedance change while the wireless power transmitter applies the first powers. For example, in the case that a foreign object is removed, a change of impedance may be detected, and the wireless power transmitter may determine that a foreign object is removed. Otherwise, in the case that a foreign object is not removed, the wireless power transmitter is unable to detect a change of impedance, and the wireless power transmitter may determine that a foreign object is not removed. In the case that a foreign object is not removed, the wireless power transmitter may output at least one of a lamp light and a warning sound and notify the current state of the wireless power transmitter to be in an error state. Accordingly, the wireless power transmitter may include an output unit that outputs at least one of a lamp light and a warning sound.

In the case that a foreign object is not removed (step, S515—N), the wireless power transmitter may maintain the Latching fault mode (step, S513). Meanwhile, in the case that a foreign object is removed (step, S515—Y), the wireless power transmitter may enter the power save mode again (step, S517). For example, the wireless power transmitter may apply second powers 651 and 652 and third powers 661 to 665.

Meanwhile, in relation to FIGS. 5 and 6, in the case that the impedance change owing to an arrangement of the wireless power receiver is not so great, it may be hard to detect the wireless power receiver.

Figure 7:
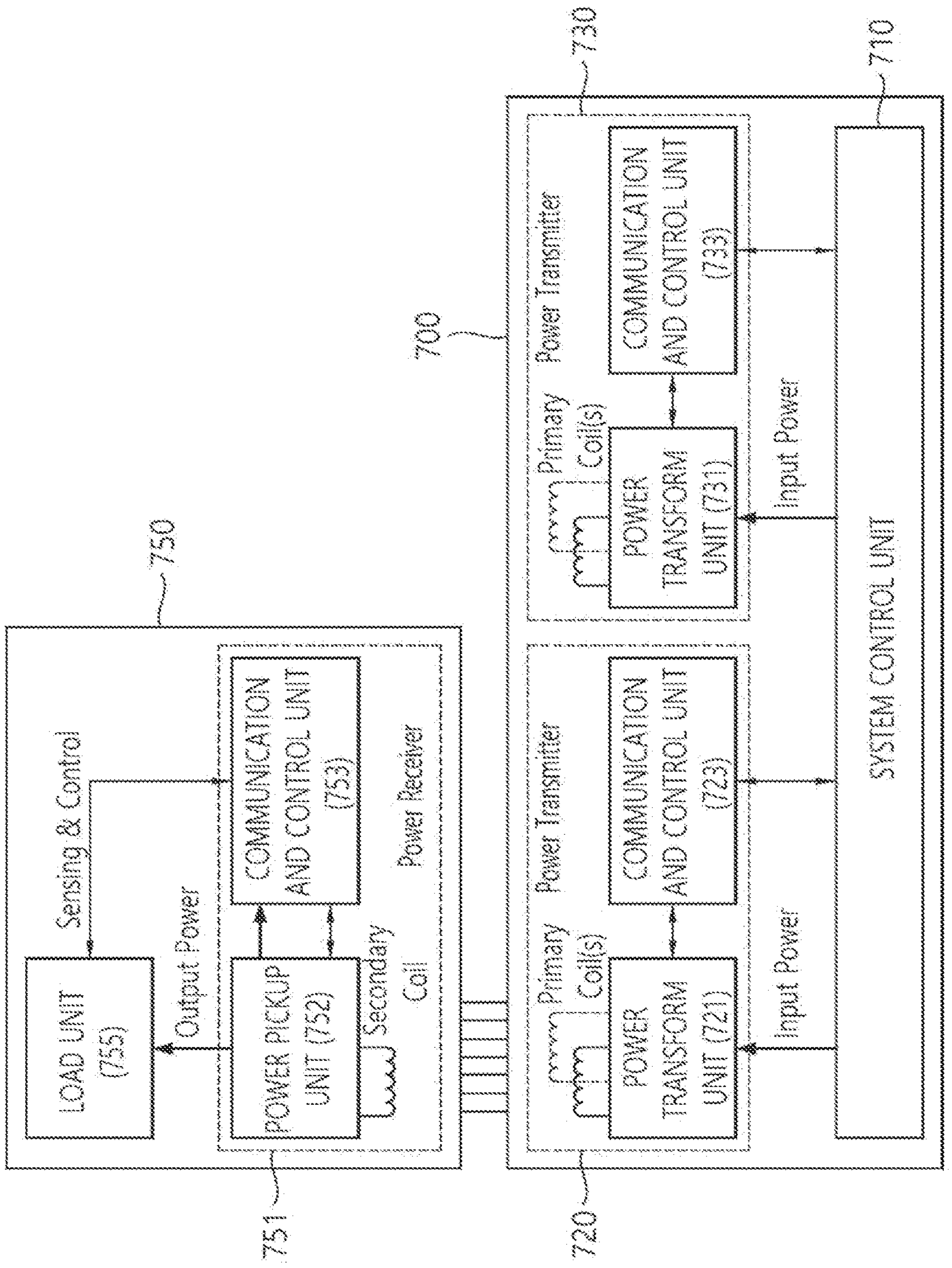
FIG. 7 is a block diagram of a wireless power transmitter and a wireless power receiver according to another embodiment of the present disclosure.

FIG. 7 is a block diagram of a wireless power transmitter and a wireless power receiver according to another embodiment of the present disclosure.

Referring to FIG. 7, a wireless power transmitter 700 may include a system control unit 710 and at least one power transmitting unit 720 and 730, and the power transmitting units 720 and 730 may include power transform units 721 and 731 and control units 723 and 733. In addition, a wireless power receiver 750 may include a power receiving unit 751 and a load unit 755, and the power receiving unit 751 may include a power pickup unit 752 and a communication and control unit 753.

The power transform units 721 and 731 may transform electrical power to wireless power, and may transmit the wireless power to the power pickup unit 752 included in a receiving unit 751 of the at least one wireless power receiver 750. The power transform units 721 and 731 may include a primary coil of the magnetic induction technique for transmitting wireless power.

The power pickup unit 752 may receive wireless power from the power transform units 721 and 731 and may transform the received wireless power to electrical power, and may include a secondary coil of the magnetic induction technique for receiving wireless power. For example, the power transform units 721 and 731 and the power pickup unit 752 may transmit and receive wireless power by maintaining the primary coil and the secondary coil in at least one of a horizontal arrangement state and a vertical arrangement state. The primary coil may be a coil of the wire-wound type and a coil array including at least one coil and may form a coreless resonance transformer part together with the secondary coil.

Meanwhile, the wireless power transmitter 700 may further include an interface surface (not shown) of a flat surface shape to transmit wireless power. At an upper part of the interface surface, at least one wireless power receiver 750 may be placed, and a primary coil may be provided at a lower part of the interface surface. In this case, a small vertical spacing may be formed between the primary coil mounted at the lower part of the interface surface and the secondary coil of the wireless power receiver 750 located at the upper part of the interface surface, and accordingly, the inductive coupling may be established between the primary coil and the secondary coil. Hereinafter, the primary coil is described in detail.

Figure 8:
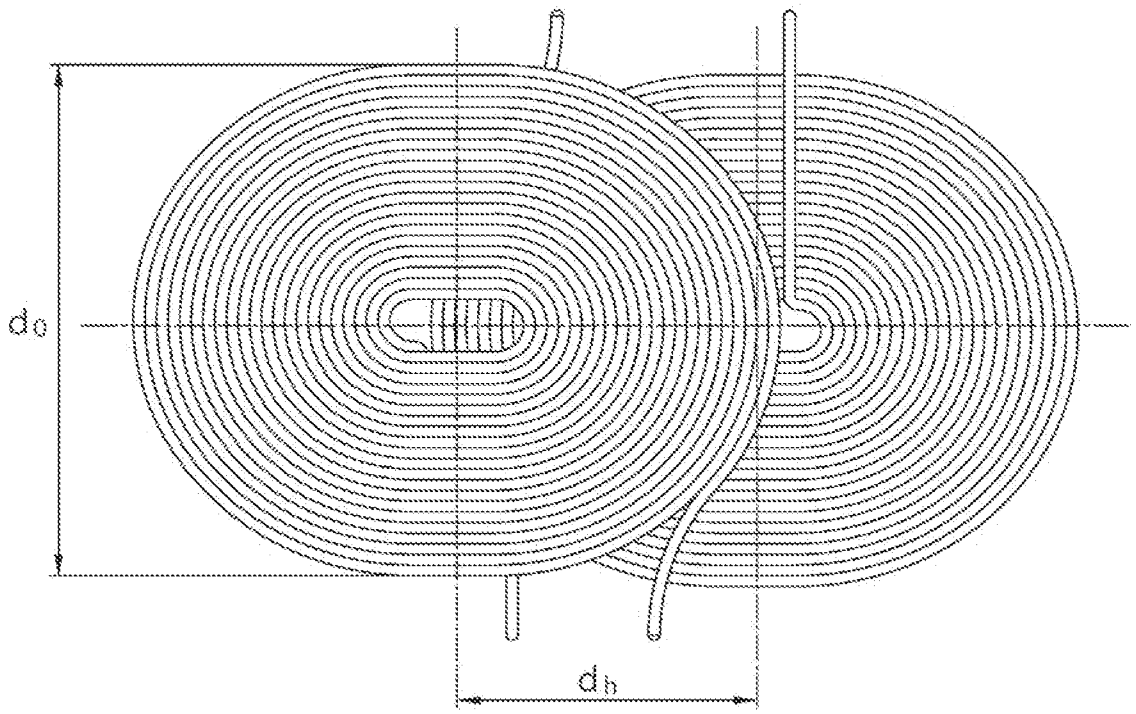
FIG. 8 is a diagram illustrating an example of including two primary coils.
Figure 9:
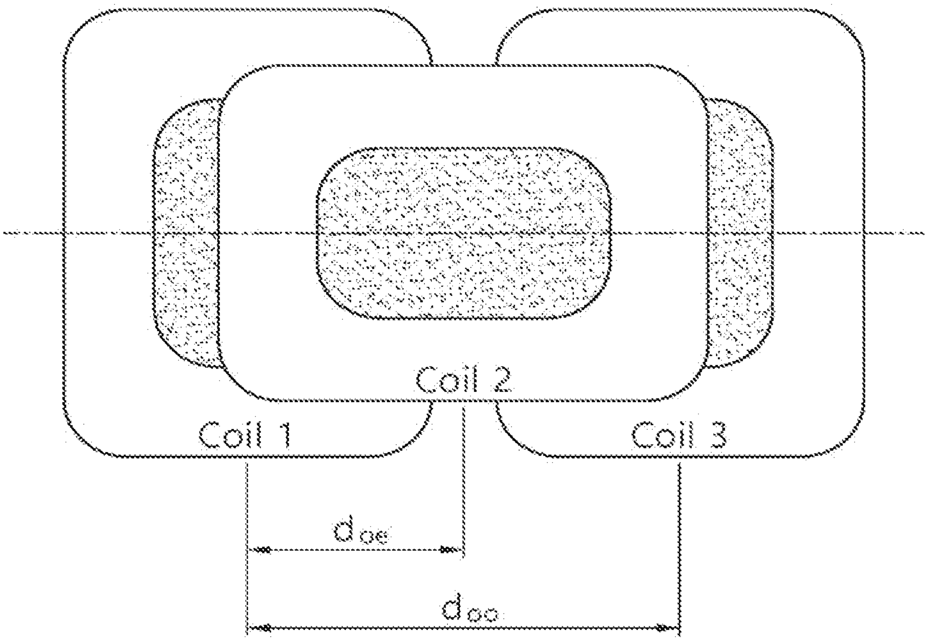
FIG. 9 is a diagram illustrating an example of including three primary coils.

FIG. 8 is a diagram illustrating an example of including two primary coils and FIG. 9 is a diagram illustrating an example of including three primary coils.

Referring to FIG. 8, two primary coils may be coils of the wire-wound type, and the coil of the wire-wound type may be constructed by Litz wire including 115 strands and a diameter of 0.08 mm. In addition, the two primary coils may have Racetrack-like shape and may be constructed as a single layer. Furthermore, parameters of the two primary coils may have $d_o$ and $d_h$, and herein, $d_o$ may be an outer diameter of the primary coil and $d_h$ may be a distance between centers of the two primary coils.

Referring to FIG. 9, the three primary coils may be constructed by Litz wire including 105 strands and a diameter of 0.08 mm. In addition, the three primary coils may have a rectangular shape, and may be constructed as a single layer. Furthermore, parameters of the three primary coils may have $d_{oe}$ and $d_{oo}$, and herein, $d_{oe}$ may be a distance between a center of a first primary coil and a center of a second primary coil, and $d_{oo}$ may be a distance between a center of the first primary coil and a center of a third primary coil.

Referring to FIG. 7 again, the communication and control unit 723 and 733 may perform a communication with at least one power receiving unit 752. In addition, the communication and control unit 723 and 733 may receive a request message for required wireless power from the power receiving unit 752, and accordingly, the communication and control unit 723 and 733 may control the power transform unit 721 such that the requested wireless power requested is transmitted to the power receiving unit 752.

The power pickup unit 752 may receive wireless power from the power transform unit 721, and the load unit 755 may charge a battery by loading the received wireless power. The communication and control unit 753 may perform a communication with transmitting units 720 and 730 and may control such that wireless power is received from the transmitting units 720 and 730. Hereinafter, by referring to FIG. 10, a detailed construction of the power transmitting units 720 and 730 is described.

Figure 10:
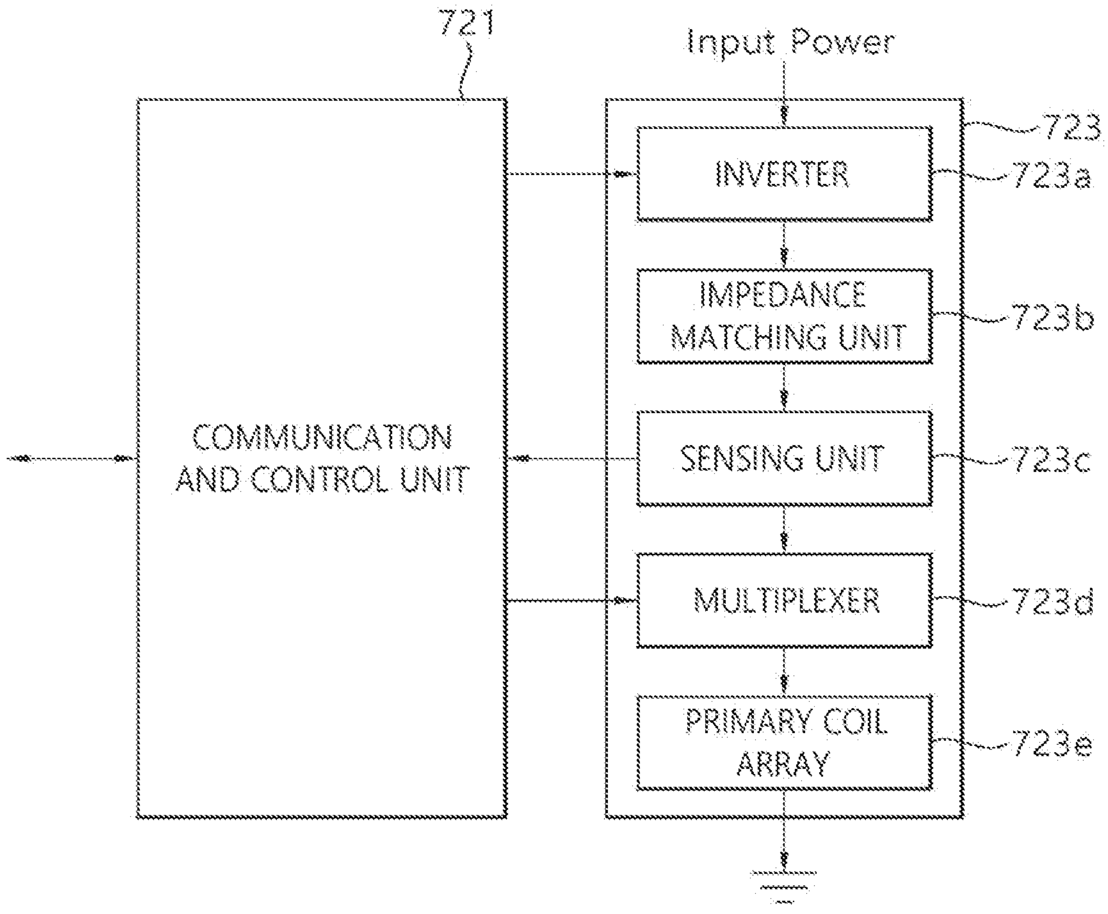
FIG. 10 is a detailed block diagram of a power transmitting unit with respect to a wireless power transmitter according to the embodiment of FIG. 7.

FIG. 10 is a detailed block diagram of a power transmitting unit with respect to a wireless power transmitter according to the embodiment of FIG. 7.

Referring to FIG. 10, the power transmitting units 720 and 730 may include the communication and control unit 721 and the power transform unit 723, and the power transform unit 723 may include an inverter 723*a*, an impedance matching unit 723*b*, a sensing unit 723*c*, a multiplexer 723*d* and a primary coil array 723*c*.

In the power transform unit 723, the inverter 723*a* may transform a direct current (DC) current an alternating current (AC) waveform, and the impedance matching unit 723*b* may match a connection between a resonance circuit and the primary coil array 723*c*. In addition, the sensing unit may detect and monitor the current and the voltage between the resonance circuit and the primary coil array 723*c*, and the multiplexer 723*d* may connect/disconnect the primary coil properly according to a position of the power receiving unit 751.

The communication and control unit 721 may receive a request message for wireless power from the power receiving unit 751 and may control a connection for a proper primary coil array through the multiplexer 723*d*. In addition, the communication and control unit 721 may control the inverter 723*a* such that an amount of wireless power is adjusted by executing a power control algorithm and protocols, and may control the primary coil array 723*e* such that the wireless power is transmitted to the power receiving unit 751. Hereinafter, by referring to FIG. 11, the primary coil array 723*e* of the power transmitting units 720 and 730 is described.

Figure 11:
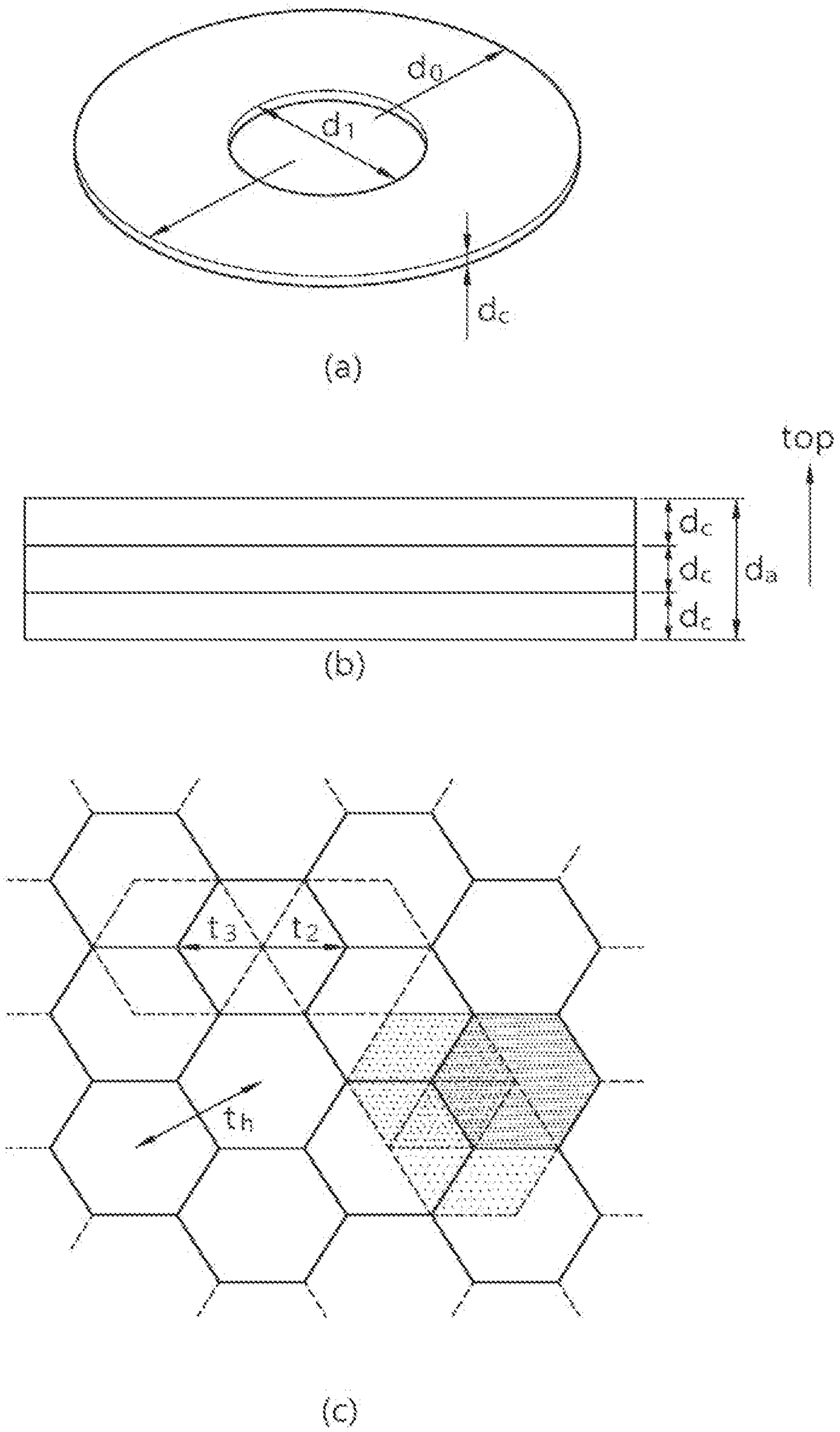
FIG. 11 is a diagram illustrating an example of a construction of a primary coil array with respect to a power transmitting unit.

FIG. 11 is a diagram illustrating an example of a construction of a primary coil array with respect to a power transmitting unit.

In FIG. 11, (a) is an example of depicting an upper single layer of a primary coil array, (b) is an example of depicting a side of a primary coil array, and (c) is an example of depicting an upper layer of a primary coil array.

The primary coil may be formed of a circular shape and may include a single layer, and the primary coil array may include a plurality of primary coil layers that has hexagonal lattice areas.

Referring to FIG. 11, primary coil array parameters may include $d_o$, $d_i$, $d_c$, $d_a$, $d_h$, $t_2$ and $t_3$. $d_o$ is an outer diameter of the primary coil layer, $d_i$ is an inner diameter of the primary coil layer, $d_c$ is a thickness of the primary coil layer, $d_a$ is a thickness of the primary coil array, $d_h$ is a distance between centers of the neighboring primary coil layers, $t_2$ is an offset of the second primary coil layer array and $t_3$ is an offset of the third primary coil layer array.

Referring to FIG. 7 again, the system control unit 710 may control a wireless power transmission with at least one wireless power receiver 750. Accordingly, the wireless power transmitter 700 may transmit wireless power to a plurality of wireless power receiver (not shown). Hereinafter, by referring to FIG. 12, the system control unit 710 that performs a control operation of the wireless power transmitter 700 is described in detail.

Figure 12:
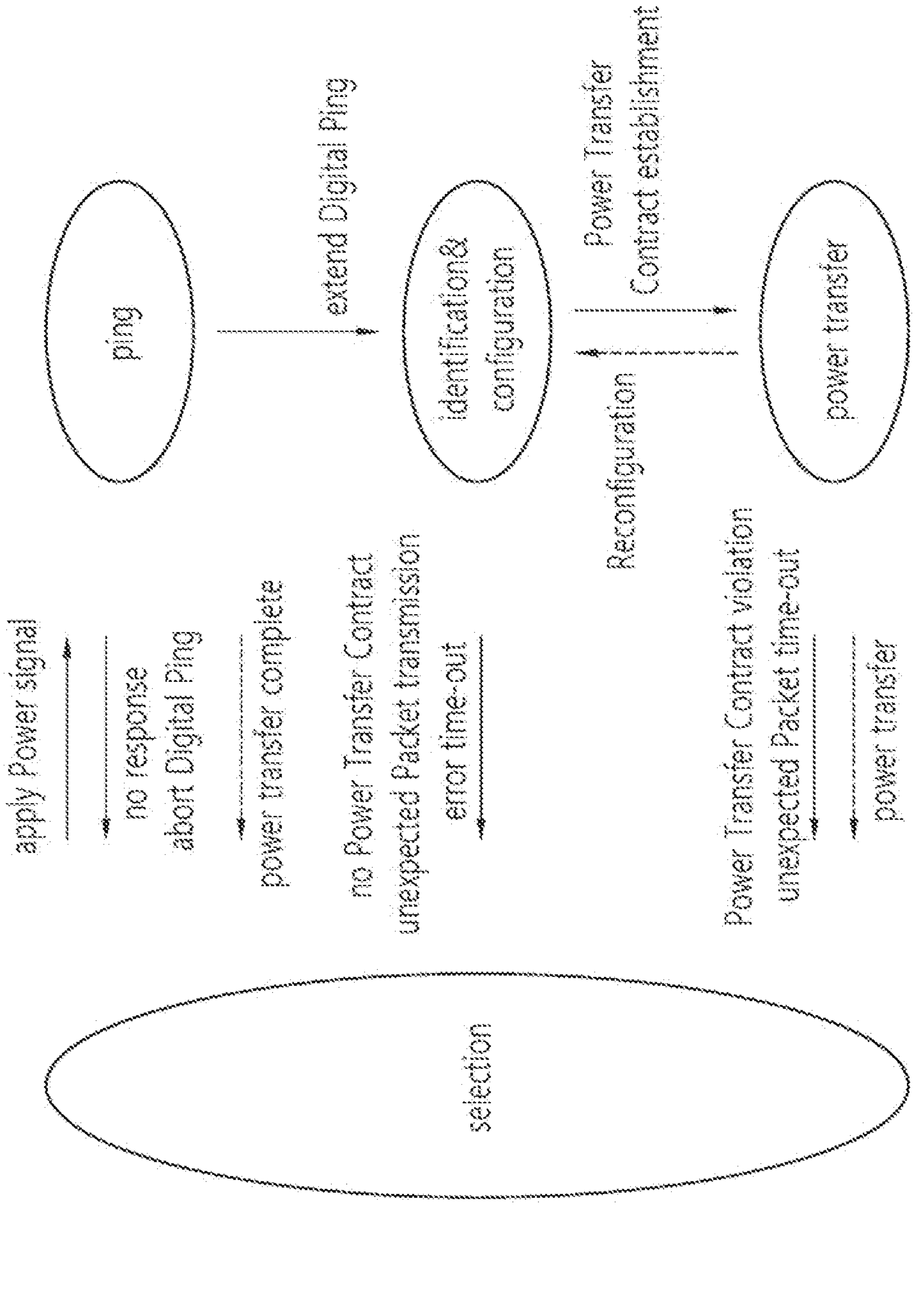
FIG. 12 is a flowchart for describing a control operation of a wireless power transmitter.

FIG. 12 is a flowchart for describing a control operation of a wireless power transmitter.

Referring to FIG. 12, the control operation of the wireless power transmitter may include a step of selection, a step of ping, a step of identification and configuration and a step of power transfer.

The step of selection may monitor an interface surface for positioning and removing the wireless power receiver. For example, the step of selection may detect and monitor at least one wireless power receiver existed in a free position, and may distinguish an entity (e.g., a foreign object, a key or a coin, etc.) which is not the wireless power receiver.

In addition, in the case that the information of the wireless power receiver is in short, the step of selection may select the related information by performing repeatedly the step of ping and the step of identification and configuration. Furthermore, the step of selection may select a primary coil to transmit wireless power to the wireless power receiver. In addition, the step of selection may switch to an idle mode in the case that the primary coil is not selected.

The step of ping may perform a digital ping and may wait until a response to the wireless power receiver is received. In addition, the step of ping may extend the digital ping or maintain the level of the digital ping in the case that the wireless power receiver is detected. Furthermore, in the case that the digital ping is not extended, the step of ping may return to the step of selection again.

The step of identification and configuration may identify the selected wireless power receiver and obtain the wireless power amount configuration information requested by the wireless power receiver.

The step of power transfer may transfer wireless power amount requested to the identified wireless power receiver and may adjust the current of the primary coil based on the control data. In addition, when a transmission for the wireless power amount requested to the identified wireless power receiver is completed, the step of power transfer may stop the wireless power transmission for the identified wireless power receiver.

Figure 13:
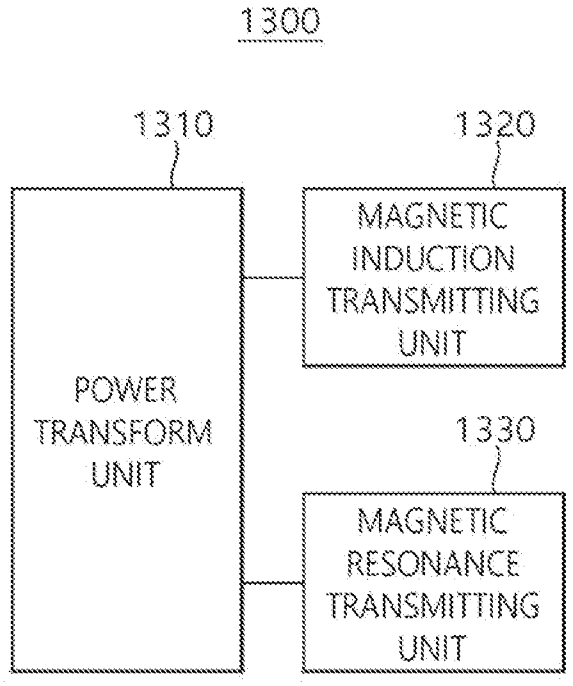
FIG. 13 is a diagram for describing a composition of a power transmitting unit according to an embodiment of the present disclosure.

FIG. 13 is a diagram for describing a composition of a power transmitting unit according to an embodiment of the present disclosure.

A power transmitting unit 1300 shown in FIG. 13 may include a power transform unit 1310 including an inverter, a magnetic induction transmitting unit 1320 for transmitting power in the magnetic induction technique and a magnetic resonance transmitting unit 1330 for transmitting power in the magnetic resonance technique.

The magnetic induction transmitting unit 1320 and the magnetic resonance transmitting unit 1330 may be turned on/off in the time division method or may be turned on/off simultaneously. Accordingly, the power transmitting unit 1300 may transmit power to a wireless power receiving device in the magnetic induction technique and to a wireless power receiving device in the magnetic resonance technique simultaneously.

Figure 14:
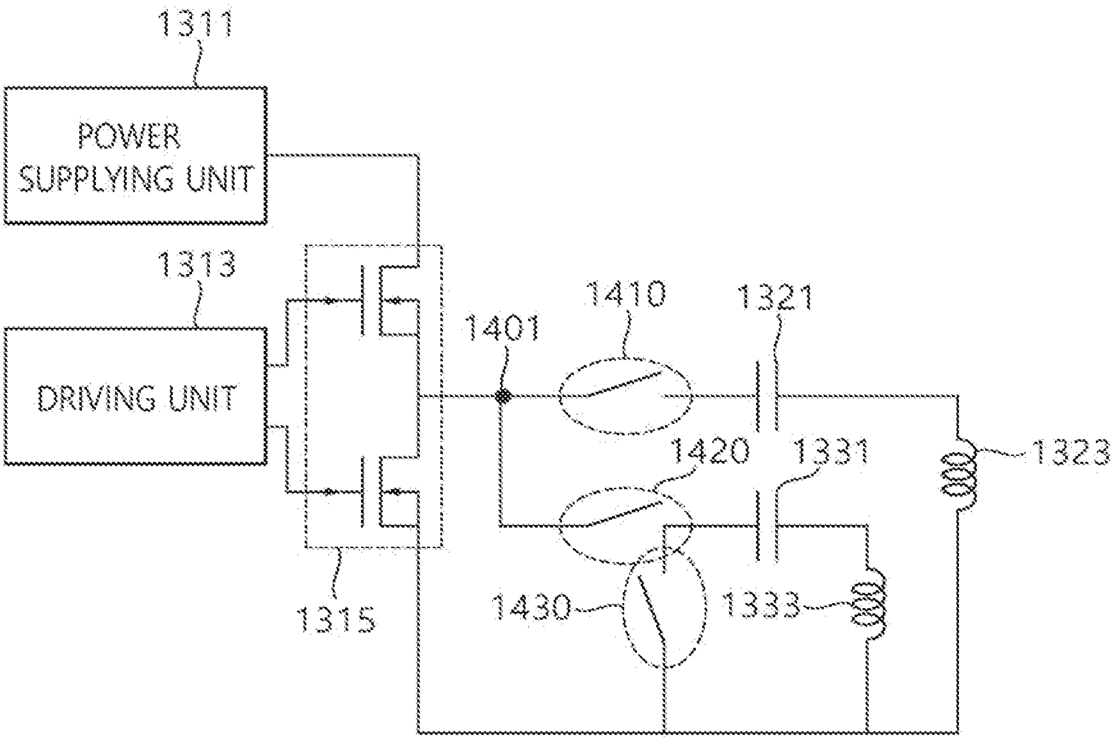
FIG. 14 is a diagram illustrating an example of a connection relation of an output terminal of the inverter with the magnetic induction transmitting unit 1320 and the magnetic resonance transmitting unit included in the power transform unit of FIG. 13.

FIG. 14 is a diagram illustrating an example of a connection relation of an output terminal of the inverter with the magnetic induction transmitting unit 1320 and the magnetic resonance transmitting unit 1330 included in the power transform unit 1310 of FIG. 13.

Referring to FIG. 13 and FIG. 14, the power transmitting unit 1300 may control a first switch 1410, a second switch 1420 and a third switch 1430, and may operate in a magnetic induction transmission mode, a magnetic resonance transmission mode and a hybrid mode. In this case, the hybrid mode may be a mode of performing the power transmission in the magnetic induction technique and the power transmission in the magnetic resonance technique.

The wireless power transmitter may perform a communication with a wireless power receiving device or may measure a change of impedance to determine an operational mode, and in the case that the type of the wireless power receiving device is not clear, the wireless power transmitter may operate in the hybrid mode.

A power supplying unit 1311 applies DC voltage to a switching unit 1315, and a driving unit 1313 controls the switching unit 1315 and outputs AC voltage to an inverter output terminal 1401.

The magnetic induction transmitting unit 1320 of FIG. 13 may include a first capacitor 1321 and a first inductor 1323.

The magnetic resonance transmitting unit 1330 of FIG. 13 may include a second capacitor 1331 and a second inductor 1333.

An end of the first switch 1410 may be connected to the inverter output terminal 1401, and another end may be connected to the first capacitor 1321.

An end of the second switch 1420 may be connected to the inverter output terminal 1401, and another end may be connected to the second capacitor 1331.

In the magnetic induction transmission mode, the first switch 1410 may be turned on and the second switch 1420 and the third switch 1430 may be turned off.

In the first magnetic resonance transmission mode, the first switch 1410 may be turned off and the second switch 1420 may be turned on.

In the second magnetic resonance transmission mode, the first switch 1410 may be turned on and the second switch 1420 may be turned on.

At this time, in the case that the power transmitting unit 1300 turns on the third switch 1430, the first switch is always turned on and the second switch 1420 is always turned off.

In the case that the third switch 1430 is turned on in the magnetic resonance transmission mode, the second capacitor 1331 and the second inductor 1333 forms a closed loop. In this case, the closed loop may be referred to as a resonator. In the second magnetic resonance transmission mode, energy may be induced from the first inductor 1323 to the second inductor 1333 and may be transferred to a wireless power receiving device through the resonator.

In the second magnetic resonance transmission mode, since the second capacitor 1331 and the second inductor 1333 operate as a resonator, the second capacitor 1331 and the second inductor 1333 does not influence on the inherent resonance frequency of the entire system. Accordingly, in the second magnetic resonance transmission mode, energy may be transferred to the wireless power receiving device with higher efficiency than that of the first magnetic resonance transmission mode. Accordingly, the second switch 1320 shown in FIG. 14 may be removed.

The power transmitting unit 1300 may operate as the hybrid mode by turning on/off the first switch 1410 and the second switch 1420 in the time division method. In addition, the power transmitting unit 1300 may operate as the hybrid mode by turning on/off the third switch 1430 in the state that the first switch 1410 is continuously turned on.

Meanwhile, in FIG. 14, the first capacitor 1321 and the first inductor 1323 may be an equivalent circuit of an induction coil and may also be referred to as a first capacitance and a second inductance, respectively. Likewise, the second capacitor 1331 and the second inductor 1333 may be an equivalent circuit of a resonance coil and may also be referred to as a second capacitance and a second inductance, respectively.

Figure 15:
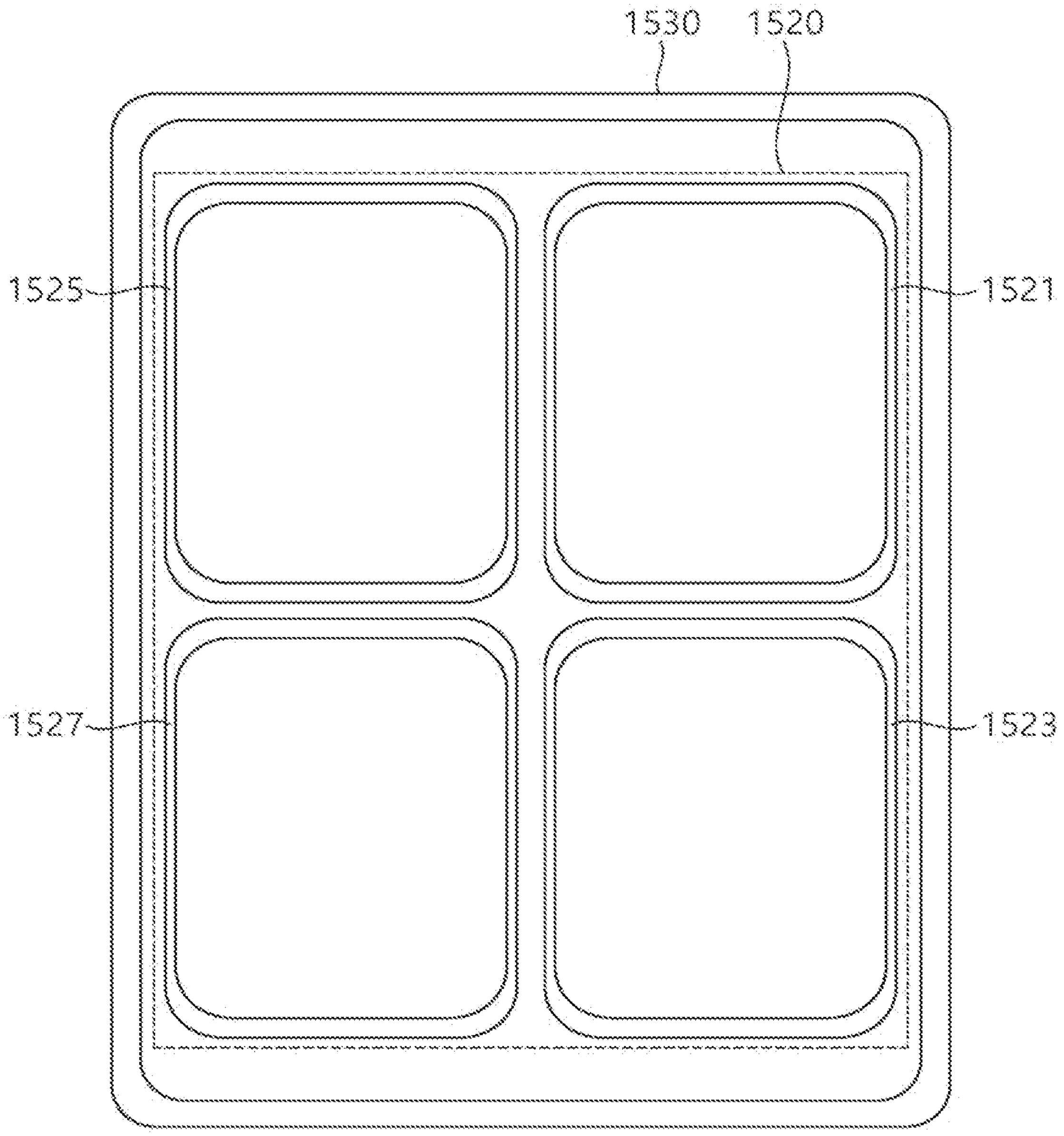
FIG. 15 illustrates an example of a composition of the magnetic induction transmitting unit and the magnetic resonance transmitting unit of FIG. 13.

FIG. 15 illustrates an example of a composition of the magnetic induction transmitting unit 1320 and the magnetic resonance transmitting unit 1330 of FIG. 13.

Referring to FIG. 15, the magnetic induction transmitting unit 1320 may include a single coil or a coil array 1520, and the magnetic resonance transmitting unit 1330 may include a resonance coil 1530 of a shape of embracing the coil array 1520.

The coil array 1520 may include a plurality of coil cells 1521, 1523, 1525 and 1527. Of course, the coil array 1520 may include a plurality of primary coils constructed as FIG. 9 or FIG. 11.

In the magnetic induction transmission mode, depending on the required power amount, only a part of a plurality of the coil cells may be turned on or all of a plurality of the coil cells may be turned on.

In addition in the case that the coil array 1520 includes a plurality of the coil cells, in the second magnetic resonance transmission mode, depending on the required power amount, only a part of a plurality of the coil cells may be turned on or all of a plurality of the coil cells may be turned on.

Figure 16:
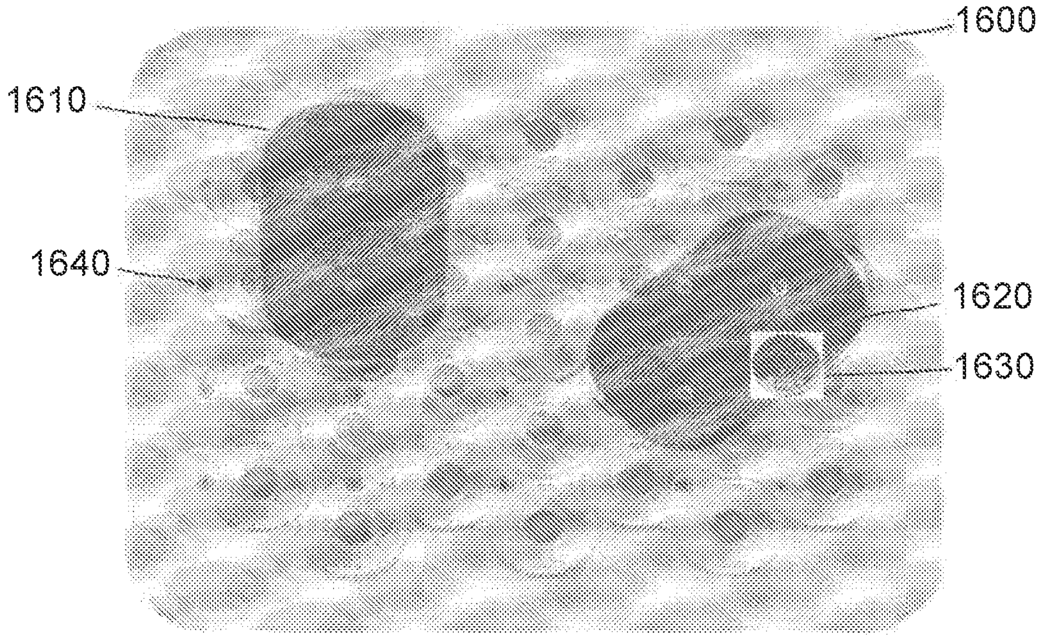
FIG. 16 is a diagram for describing a method for controlling the primary coil array of FIG. 11 according to an embodiment.

FIG. 16 is a diagram for describing a method for controlling the primary coil array of FIG. 11 according to an embodiment.

As described in FIG. 12, after the step of identification and configuration, the wireless power transmitter may operate in the step of power transfer.

At this time, in the step of power transfer, in the case that a new wireless power receiver appears, or a foreign object is existed, a method is required for controlling the primary coil array.

Referring to FIG. 16, a primary coil array 1600 according to an embodiment may include a plurality of primary coils and a plurality of sensors 1640.

In this case, the sensor 1640 may be a pressure sensor or a temperature sensor. In other words, the primary coil array 1600 may also include a plurality of pressure sensors and a plurality of temperature sensors.

The sensor 1640 may be provided on a plurality of positions of the primary coil array 1600. Accordingly, the wireless power transmitter may detect a new object on a specific position by a pressure change and may detect temperature change of a specific position through the sensor 1640.

For example, in the "Power Transfer" step for transmitting power to a first wireless power receiving device 1610 in a first time duration, when a new wireless power receiving device 1620 is located on a specific position of the primary coil array 1600, the sensing value of the pressure sensor in the corresponding position may be changed.

At this time, the wireless power transmitter may stop the "Power Transfer" step and may operate in the step of identification and configuration.

Meanwhile, in the "Power Transfer" step, a foreign object 1630 may be located on the primary coil which is operating or on the primary coil which is not operating.

At this time, the wireless power transmitter may detect the temperature on a specific position is increased through the temperature sensor. In the case that the temperature is increased over a preconfigured threshold temperature, the primary coils (e.g., four coils around the temperature sensor) that are driven around the corresponding temperature sensor may be turned off and the operation may be stopped.

In addition, even in the case that the primary coils around the temperature sensor that detects the temperature increase are turned off, when temperature is not decreased under the threshold value or increased, an operation of the entire primary coil array may be stopped temporarily. Furthermore, in order to detect a foreign object, the "Power Transfer" step is stopped, and operated in the step of identification and configuration.

In an embodiment, the temperature sensor may be provided only in three parts or four parts of the entire primary coil array 1600. In the case that three temperature sensors are provided, using the temperature difference values measured in the three sensors, a position of the cell may be determined of which the temperature increases over a threshold value.

For example, when a first temperature sensor, a second temperature sensor and a third temperature sensor are arranged in a triangle shape and the respective sensed values are A, B and C, measurement values measured in advance are stored in a table according to A-B, B-C and C-A value and the absolute value thereof. When A-B has the greatest value, A is greater than B and greater than a threshold value by a predetermined value, the primary coils around A may be turned off. Otherwise, it is also available to configure that the cells between A and C which are apart from B by a specific distance are turned off in the case that A is 25, B is 24.5 and C is 24.6.

Meanwhile, the power transmittable per each primary coil included in the primary coil array 1600 may be limited owing to temperature increase, electromagnetic wave problem, and so on. Accordingly, in order to transfer power to the wireless power receiving device, the wireless power transmitter may determine at least one primary coil to drive, and may initiate the power transmission only in the case that the maximum transmission power amount of the first coil to drive is greater than the requested power amount of the wireless power receiving device.

For example, the wireless power transmitter may identify a position and the requested power amount $P_{request}$ of the wireless power receiving device through a communication, and may calculate the transmittable power amount $P_{sum}$ of the entire primary coils to drive on the corresponding position. In this case, the number of the primary coils to drive may be limited to a preconfigured number per wireless power receiving device. The wireless power transmitter may turn on the corresponding primary coils only in the case that $P_{sum}$ is greater than $P_{request}$.

Figure 17:
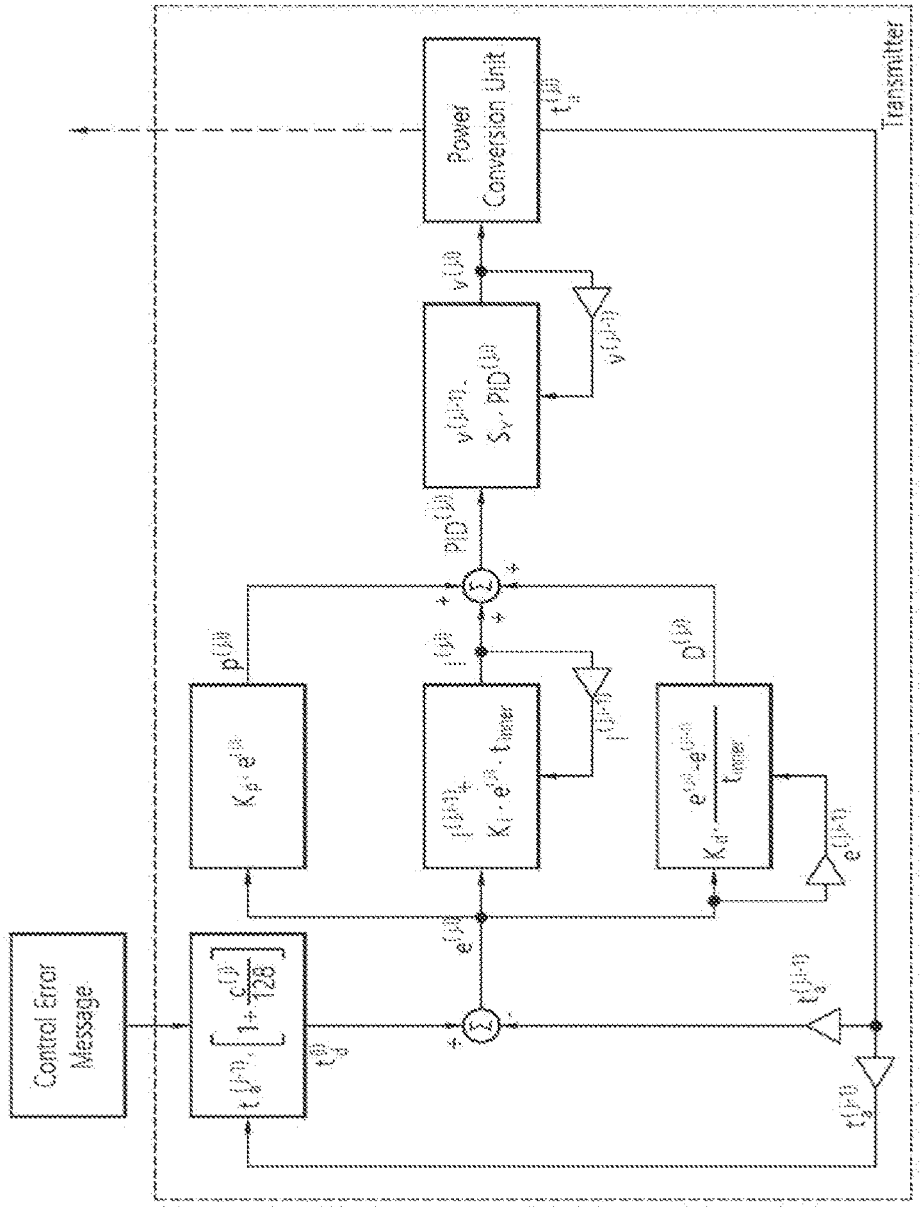
FIG. 17 is a diagram for describing a power transfer control algorithm of a wireless power transmitter.

FIG. 17 is a diagram for describing a power transfer control algorithm of a wireless power transmitter.

The power transfer control of a wireless power transmitter may be progressed by using Proportional Integral Differential (PID) algorithm. The example shown in FIG. 17 represents an example of the PID algorithm.

In the wireless power transmission system in the magnetic induction technique, examples of the PID parameters for controlling an operating frequency are as represented in Table 1, and examples of the PID parameters for controlling a duty cycle are as represented in Table 2.

TABLE 1

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms^{-1}$ |
| Integral term limit | $M_I$ | 3,000 | N.A. |
| PID output limit | $M_{PID}$ | 20,000 | N.A. |
| Scaling factor | $S_v$ | −0.01 | % |

TABLE 2

| Parameter | Symbol | Value | Unit |
|---|---|---|---|
| Proportional gain | $K_p$ | 10 | $mA^{-1}$ |
| Integral gain | $K_i$ | 0.05 | $mA^{-1}ms^{-1}$ |
| Derivative gain | $K_d$ | 0 | $mA^{-1}ms$ |
| Integral term limit | $M_I$ | 3,000 | N.A. |
| PID output limit | $M_{PID}$ | 20,000 | N.A. |
| Scaling factor | $S_v$ | −0.01 | % |

In the step of power transfer, the wireless power transmitter may control the current of the primary coil based on the control data. In this case, the current control of the primary coil may be performed based on the PID algorithm.

In FIG. 17, index j=1, 2, 3, . . . represents sequences "Control Error Packets" and "Control Error Packet" represents a message that the wireless power transmitter receives from the wireless power receiving device in the step of power transfer.

When the wireless power transmitter receives $j^{th}$ Control Error Packet, the wireless power transmitter may calculate a new primary cell current $$t_d^{(j)}$$

as Equation 1.

$$t_d^{(j)} = t_a^{(j-1)} \cdot \left[1 + \frac{c^{(j)}}{128}\right] \quad \text{[Equation 1]}$$

Herein, $c^{(j)}$ represents a control error value contained in the $j^{th}$ control error packet, and $$t_a^{(0)}$$

represents the current supplied to the primary coil initially in the step of power transfer.

The wireless power transmitter may calculate the difference of the new primary cell current and an actual primary cell current as represented in Equation 2.

$$e^{(j,i)} = t_d^{(j)} - t_a^{(j,i-1)} \quad \text{[Equation 2]}$$

Herein, $$t_a^{(j,i-1)}$$

represents the primary cell current determined in the $i-1^{th}$ iteration of the loop, and $$t_a^{(j,0)}$$

represents an actual primary cell current in the start of the loop. Index i=1, 2, . . . $i_{max}$ represents an iteration number of the PID algorithm loop.

The wireless power transmitter may calculate the Proportional term, Integral term and the Derivative term as represented in Equation 3.

$$P^{(j,i)} = K_p \cdot e^{(j,i)} \quad \text{[Equation 3]}$$

$$I^{(j,i)} = I^{(j,i-1)} + K_i \cdot e^{(j,i)} \cdot t_{inner}$$

$$D^{(j,i)} = K_d \cdot \frac{e^{(j,i)} - e^{(j,i-1)}}{t_{inner}}$$

Herein, $K_p$ is a proportional gain, $K_1$ is an integral gain, $K_d$ is a derivative gain, and $t_{inner}$ represents a time required for performing the PID algorithm loop.

The wireless power transmitter may calculate the summation of the Proportional term, Integral term and the Derivative term as represented in Equation 4.

$$PID^{(j,i)} = P^{(j,i)} + I^{(j,i)} + D^{(j,i)} \quad \text{[Equation 4]}$$

In the calculation of Equation 4, the wireless power transmitter should limit the summation $PID^{(j,i)}$.

The wireless power transmitter should calculate a new value of the controlled variable as represented in Equation 5.

$$v^{(j,i)} = v^{(j,i-1)} - S_v \cdot PID^{(j,i)} \quad \text{[Equation 5]}$$

Herein, $S_v$ is a scaling factor dependent upon the controlled variable.

The new value of the controlled variable is transferred to a power conversion unit. The new value of the controlled variable may be used as a limitation width for controlling current of the primary coil.

According to an embodiment, the wireless power transmitter may change the value of "PID output limit" depending on the number of coils driven among the coils included in the primary coil array.

For example, the wireless power transmitter may increase the value of "PID output limit" as the number of cells driven is increased, and may decrease the value of "PID output limit" as the number of cells driven is decreased.

Accordingly, by adjusting the maximum output power of each of coils in the cell, it is available to protect the wireless power transmitter and stable power transmission is available.

In addition, according to an embodiment, the wireless power transmitter may restrict the voltage and the duty used for the power control depending on the number of cells driven.

The wireless power transmitter may restrict the power inputted to the primary coil array depending on the number of driven coils among the coils included in the primary coil array.

In addition, the wireless power transmitter may restrict the output power of the inverter depending on the number of driven coils among the coils included in the primary coil array.

FIG. 3 to FIG. 7 are descriptions to the description with respect to the technique for transmitting power in the magnetic resonance technique, and FIG. 8 to FIG. 12 illustrate the technique for transmitting power in the magnetic induction technique. The example of transmitting power in the magnetic resonance technique is described in the prior art in detail. And, FIG. 13 to FIG. 17 illustrate the hybrid technique.

In FIG. 8 to FIG. 12, the magnetic induction technique may be applied to a mouse pad independently from a main device in a local computing environment and may be used for transferring power to a mouse on the mouse pad.

Figure 18:
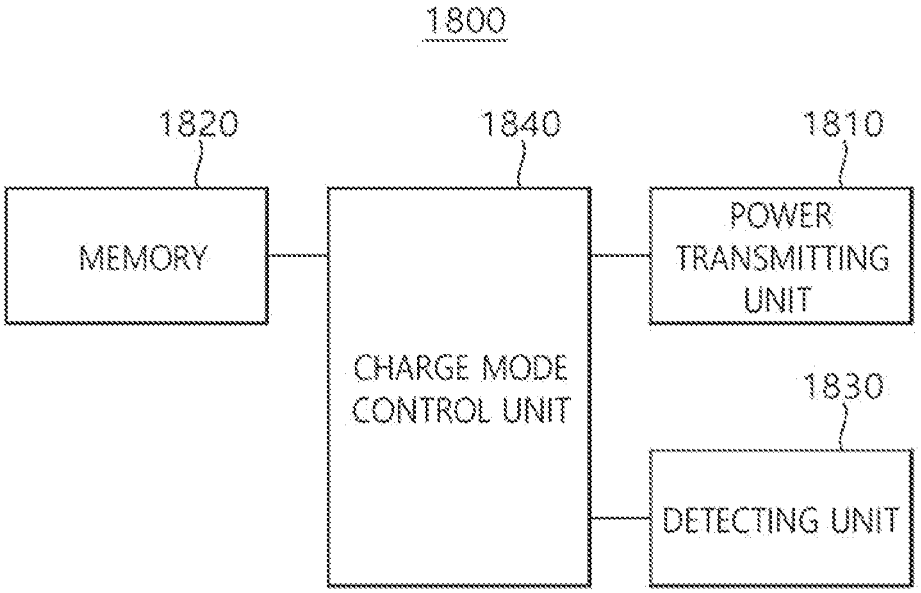
FIG. 18 illustrates a composition example of a power transmitter according to an embodiment.

FIG. 18 illustrates a composition example of a power transmitter according to an embodiment.

Referring to FIG. 18, a power transmitter 1800 includes a power transmitting unit 1810, a memory 1820 and a detecting unit 1830 and a charge mode control unit 1840.

In this case, the power transmitting unit 1810 may include a power transform unit (not shown) and a coil (not shown).

The memory 1820 stores a ping value table where a ping signal condition is mapped to each height of a power receiver.

In addition, the memory 1820 may also store a look-up table in which an optimized value of the driving condition mapped to the ping signal condition for each height of a power receiver is recorded.

The ping signal condition may be at least one of a frequency of the ping signal collected in each height, a voltage level of the ping signal and a duty ratio of the ping signal.

The detecting unit 1830 detects the power receiver by varying the ping signal depending on the ping signal condition recorded in the ping value table.

The detecting unit 1830 stores the ping signal condition successful in detecting the power receiver and configures the ping signal condition successful in detecting the power receiver as an initial value for varying the ping signal.

In this case, the initial driving condition mapped to the ping signal condition may be identical to the ping signal condition successful in detecting the power receiver.

In addition, the initial driving condition mapped to the ping signal condition may be at least one of a driving frequency for wireless charge, a voltage level and a constant value of the Proportional Integral Differential (PID) algorithm.

The constant value of the PID algorithm may be at least one of the Proportional gain, the Integral gain and the Derivative gain of Table 1, for example.

The charge mode control unit 1840 may control a charge mode according to a message received from the power receiver.

In this case, the control of the charge mode may include starting charge, ending charge, and maintaining a current state.

The charge mode control unit 1840 may identify the initial driving condition mapped to the ping signal condition successful in detecting the power receiver, and may configure the initial driving condition as an initial value of the driving frequency and the voltage level for wireless charge that corresponds to the initial driving condition.

The charge mode control unit 1840 may perform a driving condition variable procedure that varies at least one of the driving frequency and the voltage level, and depending on whether to improve the power transmission efficiency, may terminate the driving condition variable procedure or may continue the driving condition variable procedure.

Figure 19:
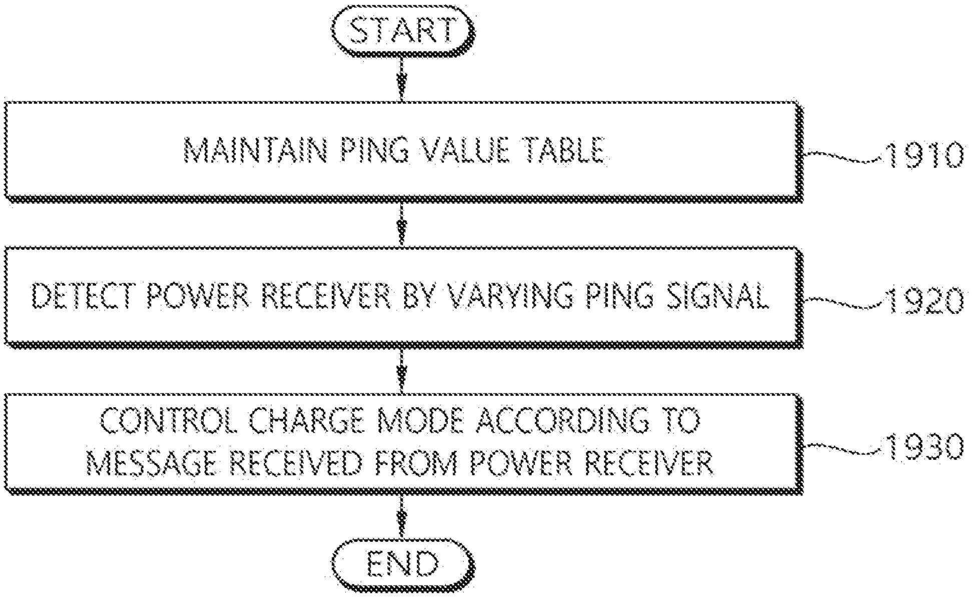
FIG. 19 illustrates an operation method of a power transmitter according to an embodiment.

FIG. 19 illustrates an operation method of a power transmitter according to an embodiment.

Referring to FIG. 19, in step 1910, a power transmitter maintains the ping value table where the ping signal condition is mapped to each height of a power receiver.

The power transmitter (transmitting device or also referred to as Tx) of the wireless power transmission and the charge system has a structure in which charge is restricted depending on a charge distance (Z axis or height). Accordingly, it may be implemented that the charge is performed without regard to the height of the power receiver (also referred to as Rx) using digital ping.

In order to generate a ping value table, through the collection of frequency/duty value of the digital ping for each height, the frequency/duty value of which charge efficiency and the like is good should be determined in each height.

Accordingly, by measuring it for a few times or dozens of time in each height, the digital ping frequency/duty value for each height may be optimized.

The selection of the collected frequency/duty is to select the frequency/duty in which charge is performed well for each height while the frequency/duty in which charge is performed well is not overlapped with the collected data. In this case, it may be selected such that the frequency/duty is not overlapped for each height.

The ping tabling of the selected frequency/duty combination may be referred to as a step of ping tabling so as to find the frequency/duty combination in accordance with each height in the fastest without regard to a height.

In step 1920, the power transmitter detects a power receiver by varying the ping signal according to the ping signal condition recorded in the ping value table.

In order to determine whether there is a power receiver through the digital ping, the power transmitter may apply current to the coil of Tx and make Rx receive a ping signal, and accordingly, may receive a charge start message or a charge end message from Rx.

In the case that Tx tries the digital ping, when a receiver is existed on Tx, the receiver may transmit the charge start message or the charge end message to Tx, and according to these messages, Tx may determine whether to perform wireless charge.

In the case that a message is not received within a predetermined time with respect to the digital pin of Tx, Tx brings the next ping data from the ping value table in order to prepare the next ping.

In step 1930, the power transmitter controls a charge mode according to the message received from the power receiver.

In the case that the received message is the "charge start message", Tx hands over the process to the next step in order to try wireless charge. Later, Tx controls wireless charge power by receiving a power control message transmitted from Rx.

In the case that the received message is the "charge end message", Tx stops a wireless charge trial, and stops the digital ping trial until the Rx receiver on the Tx coil is removed.

Using the embodiments of the present disclosure, there is an effect that a charging distance becomes flexible. Accordingly, even in the case that a user installs Tx under a desk or a table irrespective of the thickness of the desk or the table, the wireless charge may be performed smoothly.

Meanwhile, it is also available to detect an object by actively controlling duty of a ping signal.

That is, in the case that an object is detected through varying a duty ratio of a ping signal, the object detection may be tried by varying a frequency of the ping signal. In this case, the ping signal condition successful in detecting an object may be configured as an initial value of the next ping signal.

In this case, by accumulating the ping signal conditions successful in detecting an object, in the case that an object is detected in the ping signal condition for more than a few times, it is also available to set the ping signal initial value as the corresponding ping signal condition.

In an embodiment, a ping signal condition for detecting a power receiver may be any one of a frequency, a duty ratio, and a power level.

For example, it is available to vary the frequency and the voltage level simultaneously or vary the frequency and the duty simultaneously.

Since a resonant point may be changed depending on a height of the power receiver, it may be available to detect the power receiver through a frequency control.

As such, by actively varying various ping signal conditions, the success rate of detecting an object may be increased.

The driving condition varying procedure that varies at least one of a driving frequency and a voltage level may be performed for the purpose of increasing the power transmission efficiency after an initial driving condition is determined.

For example, in the case that the power transmission efficiency is calculated by varying the frequency by a predetermined value and the driving condition varying procedure is progressed in a direction that the power transmission efficiency is improved, after the frequency reaches to the value of which the power transmission efficiency is no more improved by varying the frequency continually, it is available to transmit power with the corresponding frequency.

Meanwhile, in the case that efficiency is not improved by the frequency variation, an efficiency change may be measured by changing a voltage level or by varying other different power control variable.

In this case, the driving condition varying procedure may be performed intermittently for a stable operation of a wireless power transmitting and charging system or may be performed with a predetermined time interval.

The device described herein may be implemented using software components, and/or a combination of hardware components and software components. For example, the device and the components described in the embodiments may be implemented by using a processor, a controller and an arithmetic logic unit (ALU), a digital signal processor, a microcomputer, a field programmable array (FPA), a programmable logic unit (PLU), a microprocessor or one or more general purpose computers or a specific purpose computer such as any other device capable of responding to and executing instructions. The processing device may run an operating system (OS) and one or more software applications that are performed on the OS. In addition, the processing device also may access, store, manipulate, process, and create data in response to execution of the software. For purpose of understanding, the description of a processing device is used as singular; however, one skilled in the art will appreciated that a processing device may include multiple processing elements and/or multiple types of processing elements. For example, a processing device may include multiple processors or a processor and a controller. In addition, different processing configurations are also available, such as parallel processors.

The software may include a computer program, a code, an instruction, or some combination thereof, to independently or collectively instruct so as to configure the processing device to operate as desired. Software and/or data may be embodied permanently or temporarily in any type of machine, component, physical device or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording media.

The methods according to the above-described example embodiments may be recorded in computer-readable media including program instructions to implement various operations of the above-described example embodiments. The computer-readable media may also include, alone or in combination with the program instructions, data files, data structures, and the like. According to at least some example embodiments, the program instructions recorded on the media may be those specially designed and constructed for the purposes of example embodiments. Examples of the computer-readable media include magnetic media such as hard disks, floppy disks, and magnetic tape; optical media such as CD-ROMs and DVDs; magneto-optical media such as floptical discs; and hardware devices that are specially configured to store and perform program instructions, such as ROM, RAM, flash memory and the like. Examples of program instructions include both machine code, such as produced by a compiler and a higher-level code that may be executed by the computer using an interpreter. The above-described devices may be configured to act as one or more software modules in order to perform the operations of the above-described embodiments, or vice versa.

Although the embodiments so far have been described with limited embodiments and drawings, it will be obvious that various changes and modifications may be available from the description for a person skilled in the art. For example, even though the descriptions are performed in different order from the described method, and/or the constituent components such as the system, the structure, the device, the circuit, and so on described above are coupled or combined with different shapes from the described method or substituted, the proper result can be attained.

Accordingly, other implements, other embodiments and the equivalents with patent claims are belonged to the scope of the following patent claims.

The invention claimed is:

1. A method for operating a wireless power transmitter, comprising:

maintaining a ping value table having a plurality of ping signal conditions that are mapped to different frequencies of a ping signal;

varying a ping signal condition of the ping signal according to the ping value table;

detecting a power receiver based on the ping signal of a particular ping signal condition from among a plurality of ping signal conditions; and controlling power transfer based on a charge mode according to a message from the power receiver and an initial driving condition mapped to the particular ping signal condition, the particular ping signal condition having been set based on a previous ping signal condition that was successful in detecting the power receiver.

2. The method of claim 1, wherein the ping signal condition includes at least one of a voltage level or a duty ratio of the ping signal.

3. The method of claim 1, wherein the detecting the power receiver includes:

storing the previous ping signal condition that was successful in detecting the power receiver; and setting the previous ping signal condition as an initial value for varying the ping signal.

4. The method of claim 1, wherein the controlling the power transfer includes:

determining the particular ping signal condition successful in detecting the power receiver;

determining the initial driving condition mapped to the particular ping signal condition; and performing the power transfer using the initial driving condition as an initial value of a driving frequency.

5. The method of claim 1, wherein the controlling the power transfer includes:

setting the initial driving condition as an initial value of a driving frequency or voltage level; and varying the driving frequency or voltage level to improve power transmission efficiency.

6. The method of claim 1, further comprising receiving the message in response to the ping signal.

7. The method of claim 1, wherein the ping signal is a digital ping having a frequency according to one of the plurality of ping signal conditions.

8. The method of claim 1, wherein the plurality of ping signal conditions are mapped to different heights of the power receiver.

9. A power transmitter, comprising:

a coil to transmit a ping signal;

a memory storing a ping value table having a plurality of ping signal conditions that are mapped to different frequencies of a ping signal; and a controller configured to:

vary a ping signal condition of the ping signal according to the ping value table;

detect a power receiver based on the ping signal of a particular ping signal condition from among the plurality of ping signal conditions; and control power transfer based on a charge mode according to a message from the power receiver and an initial driving condition mapped to the particular ping signal condition, the particular ping signal condition having been set based on a previous ping signal condition that was successful in detecting the power receiver.

10. The power transmitter of claim 9, wherein the controller includes:

a detecting unit; and a charge mode control unit.

11. The power transmitter of claim 9, wherein the ping signal condition includes at least one of a voltage level or a duty ratio of the ping signal.

12. The power transmitter of claim 9, wherein the controller is further configured to store:

the previous ping signal condition that was successful in detecting the power receiver; and set the previous ping signal condition as an initial value for varying the ping signal.

13. The power transmitter of claim 9, wherein the controller is further configured to:

determine the particular ping signal condition successful in detecting the power receiver;

determine the initial driving condition mapped to the particular ping signal condition; and perform the power transfer using the initial driving condition as an initial value of a driving frequency.

14. The power transmitter of claim 9, wherein the controller is further configured to:

set the initial driving condition as an initial value of a driving frequency or voltage level; and vary the driving frequency or voltage level to improve power transmission efficiency.

15. The power transmitter of claim 9, wherein the message received from the power receiver is in response to the ping signal.

16. The power transmitter of claim 9, wherein the ping signal is a digital ping having a frequency according to one of the plurality of ping signal conditions.

17. The power transmitter of claim 9, wherein the plurality of ping signal conditions are mapped to different heights of the power receiver.

* * * * *